(12) United States Patent
Nagata et al.

(10) Patent No.: US 9,071,647 B2
(45) Date of Patent: Jun. 30, 2015

(54) CODEBOOK CREATING METHOD, CODEBOOK CREATING APPARATUS AND INITIAL CODEBOOK CREATING METHOD

(71) Applicant: NTT DOCOMO, INC., Tokyo (JP)

(72) Inventors: Satoshi Nagata, Tokyo (JP); Yang Song, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/395,855

(22) PCT Filed: Apr. 12, 2013

(86) PCT No.: PCT/JP2013/061107
§ 371 (c)(1),
(2) Date: Oct. 21, 2014

(87) PCT Pub. No.: WO2013/161593
PCT Pub. Date: Oct. 31, 2013

(65) Prior Publication Data
US 2015/0103933 A1    Apr. 16, 2015

(30) Foreign Application Priority Data

Apr. 24, 2012    (CN) .......................... 2012 1 0122385

(51) Int. Cl.
*H04B 7/02*   (2006.01)
*H04L 29/06*   (2006.01)
*H04L 27/26*   (2006.01)

(52) U.S. Cl.
CPC ............ *H04L 69/22* (2013.01); *H04L 27/2626* (2013.01)

(58) Field of Classification Search
CPC ....................................... H04B 7/0413–7/0486

USPC .......................................................... 375/267
See application file for complete search history.

(56) References Cited

U.S. PATENT DOCUMENTS

| | | | |
|---|---|---|---|
| 2008/0227422 A1* | 9/2008 | Hwang et al. | 455/278.1 |
| 2008/0232501 A1* | 9/2008 | Khojastepour et al. | 375/267 |
| 2012/0213111 A1* | 8/2012 | Shimezawa et al. | 370/252 |
| 2013/0034000 A1* | 2/2013 | Huo et al. | 370/252 |
| 2013/0121312 A1* | 5/2013 | Roman et al. | 370/335 |
| 2014/0179334 A1* | 6/2014 | Forenza et al. | 455/452.2 |

OTHER PUBLICATIONS

International Search Report for corresponding International Application No. PCT/JP2013/061107, mailed Jul. 9, 2013 (4 pages).

* cited by examiner

*Primary Examiner* — Don N Vo
(74) *Attorney, Agent, or Firm* — Osha Liang LLP

(57) ABSTRACT

A codebook creating method involves acquiring amplitude or power of channel state information of channels between the transmission antennas and the reception antenna, mapping elements of a codeword of an initial codebook dynamically to the respective transmission antennas based on the amplitude or power of the channel state information thereby to create a first codebook, and scaling norms of elements corresponding to the respective transmission antennas in a codeword of the first codebook by using norm scale factors of the respective transmission antennas fixed based on the amplitude or power of the channel state information. An initial codebook creating method involves configuring a predetermined element of the codeword of the initial codebook to have a predetermined phase resolution, and configuring other elements of the codeword of the initial codebook to be arranged in an increasing or decreasing order of phase resolution.

27 Claims, 10 Drawing Sheets

CODEBOOK CREATING METHOD, CODEBOOK CREATING APPARATUS AND INITIAL CODEBOOK CREATING METHOD

TECHNICAL FIELD

The present invention relates to a radio communication field, and particularly, to a codebook creating method, a codebook creating apparatus and an initial codebook creating method for a multi-antenna radio communication system for a single cell and a multi cell.

BACKGROUND ART

In a radio communication field, there has been proposed the MIMO technique for suppressing channel fading and improving channel capacity. In a radio communication system using the MIMO technique, transmission and reception of signals are performed between a plurality of transmission antennas and a plurality of reception antennas. Then, a data stream transmitted from each transmission antenna is subjected to precoding thereby to suppress interference between data streams. In a precoding technique using a codebook, a codebook of the same definition is stored in advance in a transmission side and a reception side (for example, a base station and a user terminal in the downlink). During transmission of signals, the reception side selects an optimal codeword from the codebook and feeds back it to the transmission side. After that, the transmission side uses the codeword (for example, single user MIMO, SU-MIMO) or a matrix obtained by processing of the codeword (for example, multi user MIMO, MU-MIMO) to perform preceding of transmission symbols. Conventionally, there are two schemes of recessive feedback and dominant feedback. The recessive feedback is such a scheme that when the reception side considers elements of capacity of its receiver, it selects a codeword to maximize a system capacity or reception signal quality as an optimal codeword and feeds back a preceding matrix indicator (PMI) indicating the optimal codeword to the transmission side. The dominant feedback corresponds to a method of channel vector quantization (CVQ) and generally has no relation with reception power. That is, in the dominant feedback, a codeword that is closest to the channel direction or the channel matrix is selected from the codebook and a channel direction indicator (CDI) indicating the codeword is fed back to the transmission side. In some cases, these schemes are close to each other and replaceable. Existing codebooks (for example, including precoding matrix codebook or channel quantization codebook) include a codebook used in a closed-loop spatial multiplexing mode defined in 3GPP LTE (Long Term Evolution)/LTE-Advanced Release 8 and 10 (hereinafter referred to as "Rel. 8/10") or constant modulus codebook such as DFT codebook, and non-constant modulus codebook such as Grassmanian codebook.

SUMMARY OF THE INVENTION

Technical Problem

By arrangement of transmission antennas, MIMO radio communication systems are classified into a centralized antenna MIMO system in which transmission antennas are arranged to be centralized on the same geographical location and a distributed antenna MIMO system in which transmission antennas are arranged to be distributed to a plurality of geographical locations. As compared with the centralized antenna system, the distributed antenna system is able to further improve the system capacity and also to extend the signal coverage, which has been one of focal points of the study. However, existing codebooks (for example, the above-mentioned codebooks) are designed for the centralized antenna MIMO system and if they are applied to the distributed antenna MIMO system, or particularly, to a MU-MIMO system having a distributed antenna arrangement, a traditional constant modulus codebook cannot express nonuniformity of reception power of respective transmission antennas, which causes relatively large channel quantization error and drastically reduces the performance of MIMO which is very sensitive to the channel quantization error.

Then, for the distributed antenna MIMO system, there has been proposed a method to perform channel quantization by feeding back, from the reception side to the transmission side, information of reception power or amplitude of a signal transmitted from each transmission antenna and creating, by the transmission side, a non-constant modulus codebook while adjusting the norm of each element of the constant modulus initial codebook in accordance with the information. Take an example of channel quantization, this method allows improvement of amplitude accuracy of channel quantization. However, as it does not consider the channel phase, when a new codebook is created in accordance with the initial codebook, each element of codewords of the initial codebook is constantly mapped to the same transmission antenna irrespective of a channel condition, which makes it difficult to improve the phase accuracy of the channel quantization.

The same problem is seen in Coordinated Multi Point (CoMP) transmission system. In a certain CoMP implementing method, transmission antennas of a plurality of base stations distributed to different locations are regarded as distributed antennas and an aggregated PMI is used to feed back precoding matrix of all the channels of the plural base stations or quantization channel. In the like manner, if the conventional codebook is applied to the CoMP system using the aggregated PMI feedback, there may arise a large channel quantization error. In addition, as the number of cooperated base stations is not fixed and the number of transmission antennas is also not fixed, in designing an aggregation codebook of the CoMP system, the codebook size varies depending on the number of antennas. This causes increase in burden and complexity of codebook designing.

Then, there is a need to provide a codebook creating method and a codebook creating apparatus which are capable of simply creating a codebook applicable to the CoMP transmission system or particularly to the MIMO system having a distributed antenna arrangement or the CoMP transmission system, reducing channel quantization error when reception power from signals transmitted from respective transmission antennas are not uniform and improving the performance of the system, or particularly of the MU-MIMO system.

The present invention was carried out in view of the above-mentioned problem. The present invention has an object to provide a codebook creating method, a codebook creating apparatus and an initial codebook creating method capable of, when it is applied to a multi-antenna radio communication system (particularly, a MIMO system having a distributed antenna arrangement or CoMP transmission system), reducing channel quantization error when reception power of signals transmitted from respective transmission antennas are not uniform, improving the system performance and particularly the performance of the MU-MIMO system.

Solution to Problem

A first aspect of the present invention provides a codebook creating method in a radio communication system having a plurality of transmission antennas and a reception antenna, the codebook creating method comprising the steps of: acquiring amplitude or power of channel state information of channels between the transmission antennas and the reception antenna; and mapping elements of a codeword of an initial codebook dynamically to the respective transmission antennas based on the amplitude or power of the channel state information thereby to create a first codebook.

Another aspect of the present invention provides an initial codebook creating method having a codeword having a plurality of elements, the initial codebook creating method comprising the steps of: configuring a predetermined element of the codeword of the initial codebook to have a predetermined phase resolution; and configuring other elements of the codeword of the initial codebook to be arranged in an increasing or decreasing order of phase resolution, and wherein in the initial codebook, an order of arrangement between elements of same phase resolution is an arbitrary order. Note that the phase resolution indicates a number of all possible phases for elements of a same position in all codewords of the initial codebook.

Yet another aspect of the present invention provides a codebook creating apparatus in a radio communication system having a plurality of transmission antennas and a reception antenna, the codebook creating apparatus comprising: an acquiring unit configured to acquire amplitude or power of channel state information of channels between the transmission antennas and the reception antenna; and a mapping unit configured to map elements of a codeword of an initial codebook dynamically to the respective transmission antennas based on the amplitude or power of the channel state information thereby to create a first codebook.

Technical Advantage of the Invention

According to the above-mentioned aspects of the present invention, when reception power of signals transmitted from respective transmission antennas are not uniform in a MIMO system having a distributed antenna arrangement or CoMP transmission system, the position of each codeword element of an initial codebook is adjusted in accordance with channel state information of a channel between each transmission antenna and each reception antenna thereby to perform mapping to each transmission antenna dynamically. Then, the created codebook is further matched with a channel state to reduce quantization error in channel quantization.

DESCRIPTION OF EMBODIMENTS

Figure 1:
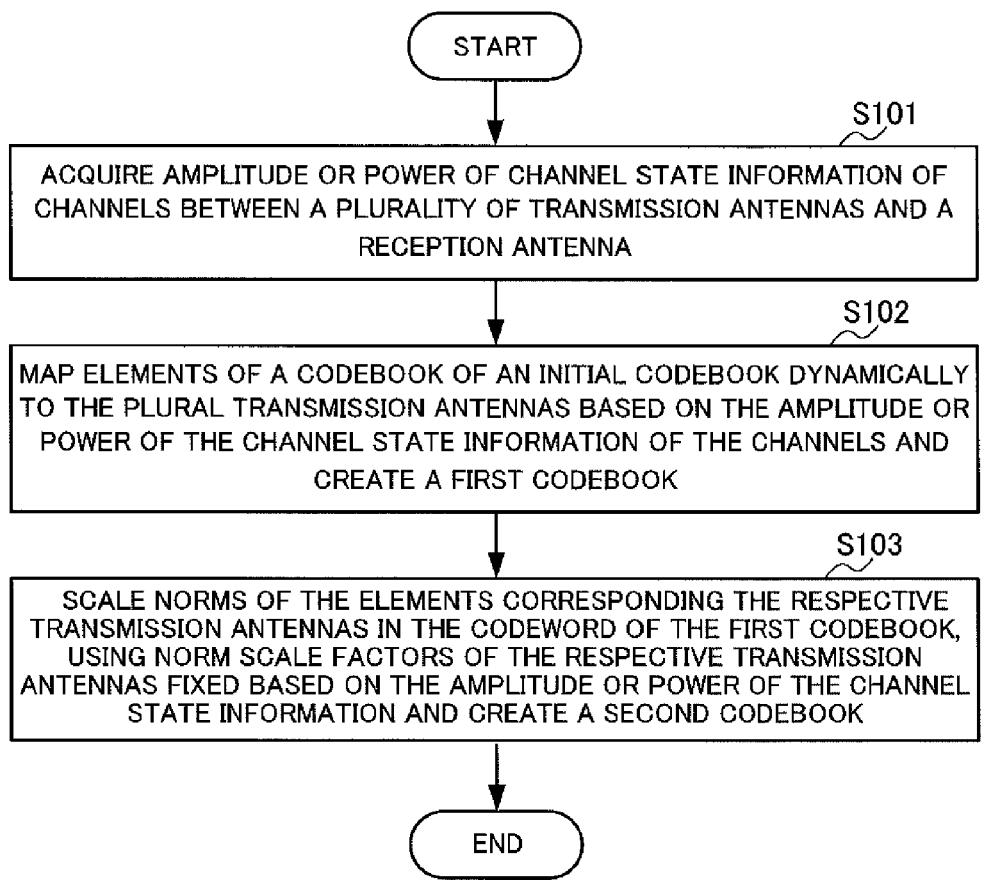
FIG. 1 is a flowchart of a codebook creating method according to a first embodiment of the present invention.

The purpose, features and merits of the present invention will be further apparent when the embodiments of the present invention are explained with the drawings. With reference to the drawings, the codebook creating method, the codebook creating apparatus and the initial codebook creating method of embodiments of the present invention are described below. In the drawings, the same reference numerals indicate the same elements. The present invention is applicable to radio communication systems having a plurality of (for example, four, eight or more) transmission antennas, including the MIMO system having a distributed transmission antenna arrangement, the MIMO system having a centralized transmission antenna arrangement and the CoMP transmission system.

First, description is made about the codebook creating method according to a first embodiment of the present invention. This method is applicable to a radio communication system having a plurality of transmission antennas (for example, at the transmission side) and at least one reception antenna (for example, at the reception side). In the following description, for ease of explanation, downlink communication is taken as an example, and a base station is the transmission side and a user terminal (UE) is the reception side. Needless to say, other signal transmitting apparatuses and signal receiving apparatuses (for example, UE and base stations in an uplink communication) can be also used as the transmission side and reception side.

According to the first codebook creating method of the present invention, a non-constant modulus codebook is created based on the constant modulus codebook. In brief, elements of the initial codebook are dynamically mapped to a plurality of transmission antennas in accordance with amplitude and power of channel state information of channels between transmission antennas and reception antennas and then, scaling norm of a codeword element corresponding to each transmission antenna using a norm scale factor of the transmission antenna fixed based on the amplitude or power of the channel state information thereby to create the non-constant modulus codebook. This method needs to be performed at both of the base station and the user terminal.

With reference to FIG. 1, the codebook creating method according to the first embodiment of the present invention will be described.

As illustrated in FIG. 1, at the step S101, amplitude or power of channel state information of channels of the above-mentioned transmission antennas and reception antenna is acquired.

In the radio communication system, the base station is able to transmit pilot signals (for example, channel state information-reference signals (CSI-RSs) in LTE-A) from respective transmission antennas to UE having at least one reception antenna. UE receives the pilot signals by the reception antenna and measures amplitude and power of channel state information of channels between the plural transmission antenna and the reception antenna based on the pilot signals. In this way, magnitude relation of the amplitude and power of the channel state information among channels of the transmission antennas and the reception antenna can be fixed. When the UE performs the above-mentioned method, the UE measures the amplitude and power of the pilot signals transmitted from the respective transmission antennas, which can be used as the amplitude and power of the channel state information. As an alternative way, the UE performs channel estimation on the pilot signals transmitted from the respective transmission antennas and received by the reception antenna and, after acquiring a channel matrix H of each of all of the channels between the transmission antennas and reception antenna, the UE performs singular value decomposition (SVD) of the channel matrix and can obtain the norm of each element of a right dominant singular vector of the channel matrix H as the amplitude of the channel state information.

When the base station performs the above-mentioned method, the UE feeds back amplitude and power of channel state information measured by the above-mentioned method to the base station so that the base station can acquire the amplitude and power. This feedback may be performed periodically or aperiodically in accordance with a request from the base station. In order to reduce overhead by the feedback, it is preferable to perform the feedback with a long period or feed back an average of amplitude and power of a plurality of subcarriers. The period of this feedback is, for example, longer than the feedback period of a PMI or CDI (as described later). As an alternative way, when channels between the transmission antennas and the reception antenna have uplink/downlink reciprocity, the base station measures the pilot signals transmitted from the UE and other analogue sounding signals thereby to be able to obtain amplitude and power of the channel state information.

Then, at the step S102, each codeword element of the initial codebook is mapped to a transmission antenna based on the amplitude and power of the channel state information for transmitting each signal dynamically, thereby to create a first codebook.

Specifically, the initial codebook is stored in advance in both of the base station and UE. This initial codebook may be a constant modulus codebook having a plurality of codewords. Here, each codeword is denoted by a PMI. In a codebook of Rank 1 (single data stream transmission), each codeword is a column vector having a plurality of elements and each element corresponds to one transmission antenna and includes an initial norm and a phase value of data processing of the transmission antenna. In this description, the number of possible phases for elements at the same location for all codewords in one codebook is called phase resolution. Each element of the initial codebook may have same or different phase resolution.

In mapping the elements, such mapping is different from fixed mapping in the conventional art and is performed in such a manner that each element of a codeword of the initial codebook is dynamically mapped to a transmission antenna based on amplitude and power of channel state information of the transmission antenna and the reception antenna and a new codebook (which is called "first codebook" for convenience of explanation) is created.

This mapping may be performed by plural types of methods. For example, in a first mapping method, an element of phase resolution 1 in a codeword of the initial codebook is mapped to any transmission antenna (that is, by adjusting to the location of an element corresponding to any transmission antenna in the codeword of the first codebook), another element of the codeword of the initial codebook is mapped to another transmission antenna (that is, by adjusting to the location of an element corresponding to the other transmission antenna in the first codebook). Note that the smaller amplitude or power of channel state information between the other transmission antenna and the reception antenna is, the lower the phase resolution of the element mapped to the transmission antenna is. This may be understood such that the phase of an element of phase resolution 1 (generally "0") is set as a reference phase and mapping to a transmission antenna is performed based on a resolution of a phase difference (relative phase) of the phase of another element relative to the reference phase. As a better way, an element of phase resolution 1 may be mapped to such a transmission antenna that amplitude or power of channel state information of a channel between the transmission antenna and the reception antenna is maximized or minimized. In a second mapping method, each of elements of the codeword of the initial codebook may be mapped to a transmission antenna in such a manner that the smaller amplitude or power of channel state information of a channel between the transmission antenna and the reception antenna is, the lower the phase resolution of an element to be mapped to the transmission antenna is. This may be understood such that mapping to a transmission antenna is performed in accordance with the absolute phase of each element. If several elements in the initial codebook have the same phase resolution, these elements may be mapped in any order, however, the above-mentioned mapping order needs to be maintained between these elements and other elements.

The mapping relation between elements of the initial codebook and respective transmission antennas (or correspondence between each transmission antenna and an element in each codeword in the first codebook) is denoted by a permutation matrix and the mapping is performed by multiplying the permutation matrix by the initial codebook to acquire the first codebook. This will be described later, with reference to a specific example.

At the step S102, the used initial codebook may be any well-known codebook such as DFT codebook or Rel. 8/10 codebook. Tables 1 and 2 show examples of Rel. 8/10 rank 1 codebook and DFT codebook in the 4-transmission antenna MIMO system. These codebooks are constant modulus codebooks and have 16 codewords (PMI=0, 1, . . . , 15). Each codeword has 4 elements, which correspond to 4 transmission antennas (hereinafter referred to as "transmission antennas 1-4), respectively and have phases of $\theta_1, \theta_2, \theta_3, \theta_4$, respectively.

TABLE 1

| PMI | 0 | 1 | 2 | 3 | 4 | 5 | 6 | 7 |
|---|---|---|---|---|---|---|---|---|
| $\theta_1$ | 0 | 0 | 0 | 0 | 0 | 0 | 0 | 0 |
| $\theta_2$ | $\frac{0\pi}{4}$ | $\frac{2\pi}{4}$ | $\frac{4\pi}{4}$ | $\frac{6\pi}{4}$ | $\frac{1\pi}{4}$ | $\frac{3\pi}{4}$ | $\frac{5\pi}{4}$ | $\frac{7\pi}{4}$ |

TABLE 1-continued

| | | | | | | | | |
|---|---|---|---|---|---|---|---|---|
| $\theta_3$ | $\frac{0\pi}{4}$ | $\frac{4\pi}{4}$ | $\frac{0\pi}{4}$ | $\frac{4\pi}{4}$ | $\frac{2\pi}{4}$ | $\frac{6\pi}{4}$ | $\frac{2\pi}{4}$ | $\frac{6\pi}{4}$ |
| $\theta_4$ | $\frac{0\pi}{4}$ | $\frac{6\pi}{4}$ | $\frac{4\pi}{4}$ | $\frac{2\pi}{4}$ | $\frac{3\pi}{4}$ | $\frac{1\pi}{4}$ | $\frac{7\pi}{4}$ | $\frac{5\pi}{4}$ |
| PMI | 8 | 9 | 10 | 11 | 12 | 13 | 14 | 15 |
| $\theta_1$ | 0 | 0 | 0 | 0 | 0 | 0 | 0 | 0 |
| $\theta_2$ | $\frac{0\pi}{4}$ | $\frac{2\pi}{4}$ | $\frac{4\pi}{4}$ | $\frac{6\pi}{4}$ | $\frac{0\pi}{4}$ | $\frac{0\pi}{4}$ | $\frac{4\pi}{4}$ | $\frac{4\pi}{4}$ |
| $\theta_3$ | $\frac{4\pi}{4}$ | $\frac{0\pi}{4}$ | $\frac{4\pi}{4}$ | $\frac{0\pi}{4}$ | $\frac{0\pi}{4}$ | $\frac{4\pi}{4}$ | $\frac{0\pi}{4}$ | $\frac{4\pi}{4}$ |
| $\theta_4$ | $\frac{4\pi}{4}$ | $\frac{2\pi}{4}$ | $\frac{0\pi}{4}$ | $\frac{6\pi}{4}$ | $\frac{4\pi}{4}$ | $\frac{0\pi}{4}$ | $\frac{0\pi}{4}$ | $\frac{4\pi}{4}$ |

TABLE 2

| PMI | 0 | 1 | 2 | 3 | 4 | 5 | 6 | 7 |
|---|---|---|---|---|---|---|---|---|
| $\theta_1$ | 0 | 0 | 0 | 0 | 0 | 0 | 0 | 0 |
| $\theta_2$ | $\frac{0\pi}{8}$ | $\frac{1\pi}{8}$ | $\frac{2\pi}{8}$ | $\frac{3\pi}{8}$ | $\frac{4\pi}{8}$ | $\frac{5\pi}{8}$ | $\frac{6\pi}{8}$ | $\frac{7\pi}{8}$ |
| $\theta_3$ | $\frac{0\pi}{8}$ | $\frac{2\pi}{8}$ | $\frac{4\pi}{8}$ | $\frac{6\pi}{8}$ | $\frac{8\pi}{8}$ | $\frac{10\pi}{8}$ | $\frac{12\pi}{8}$ | $\frac{14\pi}{8}$ |
| $\theta_4$ | $\frac{0\pi}{8}$ | $\frac{3\pi}{8}$ | $\frac{6\pi}{8}$ | $\frac{9\pi}{8}$ | $\frac{12\pi}{8}$ | $\frac{15\pi}{8}$ | $\frac{2\pi}{8}$ | $\frac{5\pi}{8}$ |
| PMI | 8 | 9 | 10 | 11 | 12 | 13 | 14 | 15 |
| $\theta_1$ | 0 | 0 | 0 | 0 | 0 | 0 | 0 | 0 |
| $\theta_2$ | $\frac{8\pi}{8}$ | $\frac{9\pi}{8}$ | $\frac{10\pi}{8}$ | $\frac{11\pi}{8}$ | $\frac{12\pi}{8}$ | $\frac{13\pi}{8}$ | $\frac{14\pi}{8}$ | $\frac{15\pi}{8}$ |
| $\theta_3$ | $\frac{0\pi}{8}$ | $\frac{2\pi}{8}$ | $\frac{4\pi}{8}$ | $\frac{4\pi}{8}$ | $\frac{6\pi}{8}$ | $\frac{8\pi}{8}$ | $\frac{10\pi}{8}$ | $\frac{12\pi}{8}$ |
| $\theta_4$ | $\frac{8\pi}{8}$ | $\frac{11\pi}{8}$ | $\frac{14\pi}{8}$ | $\frac{1\pi}{8}$ | $\frac{4\pi}{8}$ | $\frac{7\pi}{8}$ | $\frac{10\pi}{8}$ | $\frac{13\pi}{8}$ |

In the example of Rel. 8/10 rank 1 codebook shown in Table 1, elements corresponding to transmission antenna 1 in all of the codewords (first elements, that is, elements of phase $\theta_1$) have only one possible phase (0). Therefore, the phase resolution is 1 and elements corresponding to the transmission antennas 2-4 (second to fourth elements, that is, elements of phase $\theta_2$-$\theta_4$) have 8 possible phases, 4 possible phases and 8 possible phases, respectively. Then, their phase resolutions are 8, 4 and 8, respectively. In the example of DFT codebook shown in Table 2, the phase resolutions of elements corresponding to the transmission antennas 1-4 are 1, 16, 8 and 16, respectively. Each combination of the element phases in the Rel. 8/10 rank 1 codebook and the DFT codebook shown in Tables 1 and 2, respectively, is merely one out of many combinations that conform to a predetermined relation. The initial codebook may be created by any other phase combination.

As a better way, the initial codebook according to the first embodiment of the present invention is the initial codebook used at the step S102. This initial codebook is a constant modulus codebook and elements of each codeword correspond to respective transmission antennas and phase resolutions of these elements are not completely same. The initial codebook according to the first embodiment of the present invention has some types. In the first-type initial codebook, an element of phase 1 in the codeword may be at the location of any element of the codebook. Other elements of the codeword are arranged in the increasing or decreasing order of the phase resolution. For simplifying the mapping operation, in the second-type initial codebook, the first element is arranged first, and other elements of the codeword are arranged in the increasing or decreasing order of the phase resolution. In these two-type initial codebooks, if there are elements of same phase resolution in the codeword, the order of arrangement of these elements may be any order.

Figure 2:
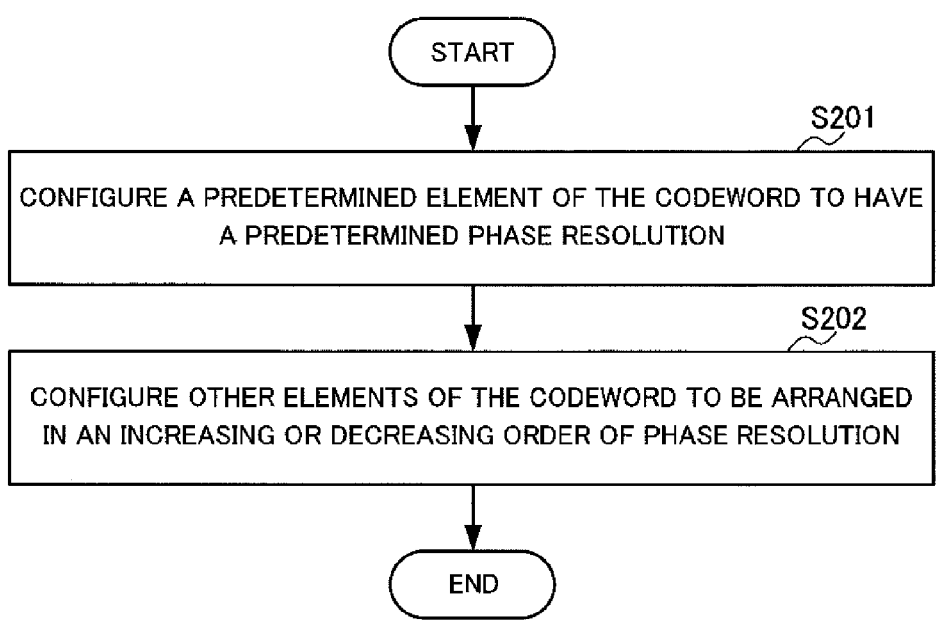
FIG. 2 is a flowchart of an initial codebook creating method according to the first embodiment of the present invention.

The initial codebook according to the first embodiment of the present invention may be created in accordance with the method shown in FIG. 2. As illustrated in FIG. 2, at the step S201, a predetermined element in the codeword is arranged to have a predetermined resolution. At the step S202, other elements of the codeword are arranged in the increasing or decreasing order of the phase resolution. As a better way, the predetermined resolution is set to 1 and the predetermined element is set to an element at any location in the codeword. This corresponds to the first-type initial codebook. As an alternative way, the predetermined phase resolution may be a maximal phase resolution (greater than phase resolutions of all of other elements) or a minimal phase resolution (smaller than phase resolutions of all of other elements) and all the elements of the codeword are arranged in the increasing or decreasing order of the phase resolution. This corresponds to the second-type initial codebook.

Table 3 illustrates an example of the initial codebook according to the first embodiment of the present invention in 4-transmission antenna MIMO system. Elements of all codewords of this initial codebook are constant modulus. For convenience of explanation, the phases of the elements of the initial codebook are merely shown in Table 3.

and reception antenna, for example, reception power of pilot signals transmitted from respective transmission antennas of the base station or norm of each element of right dominant singular vector of the channel matrix H representing the channel is obtained. Comparative relation of transmission power of the transmission antennas is obtained based on the amplitude or power of channel state information, and when the total transmission power of all the antennas is constant, transmission power of the transmission antennas is allocated in accordance with the comparative relation. Then, norm scale factors of respective transmission antennas are obtained, these norm scale factors are used to perform scaling on norms of the elements corresponding to the respective transmission antennas in the codewords of the first codebook, and the elements

TABLE 3

| PMI | 0 | 1 | 2 | 3 | 4 | 5 | 6 | 7 |
|---|---|---|---|---|---|---|---|---|
| $\theta_1$ | 0 | 0 | 0 | 0 | 0 | 0 | 0 | 0 |
| $\theta_2$ | $\frac{0\pi}{8}$ | $\frac{1\pi}{8}$ | $\frac{2\pi}{8}$ | $\frac{3\pi}{8}$ | $\frac{4\pi}{8}$ | $\frac{5\pi}{8}$ | $\frac{6\pi}{8}$ | $\frac{7\pi}{8}$ |
| $\theta_3$ | $\frac{0\pi}{2}$ | $\frac{1\pi}{2}$ | $\frac{2\pi}{2}$ | $\frac{3\pi}{2}$ | $\frac{0\pi}{2}$ | $\frac{1\pi}{2}$ | $\frac{2\pi}{2}$ | $\frac{3\pi}{2}$ |
| $\theta_4$ | 0 | $\pi$ | 0 | $\pi$ | 0 | $\pi$ | 0 | $\pi$ |
| PMI | 8 | 9 | 10 | 11 | 12 | 13 | 14 | 15 |
| $\theta_1$ | 0 | 0 | 0 | 0 | 0 | 0 | 0 | 0 |
| $\theta_2$ | $\frac{8\pi}{8}$ | $\frac{9\pi}{8}$ | $\frac{10\pi}{8}$ | $\frac{11\pi}{8}$ | $\frac{12\pi}{8}$ | $\frac{13\pi}{8}$ | $\frac{14\pi}{8}$ | $\frac{15\pi}{8}$ |
| $\theta_3$ | $\frac{0\pi}{2}$ | $\frac{1\pi}{2}$ | $\frac{2\pi}{2}$ | $\frac{3\pi}{2}$ | $\frac{0\pi}{2}$ | $\frac{1\pi}{2}$ | $\frac{2\pi}{2}$ | $\frac{3\pi}{2}$ |
| $\theta_4$ | 0 | $\pi$ | 0 | $\pi$ | 0 | $\pi$ | 0 | $\pi$ |

The example of the initial codebook shown in Table 3 is the first-type initial codebook. The phase resolutions of 4 elements of the codewords of this initial codebook are 1, 16, 4 and 2, respectively. That is, in each codeword, the other three elements (second to fourth elements), excluding the element of phase resolution 1 (first element), have sequentially decreasing phase resolutions.

According to this mapping method, it is possible to map elements of the codeword of different phase resolutions to respective transmission antennas based on amplitude or power of channel state information of channels between the transmission antennas and reception antenna. Then, a relatively large phase resolution is made to correspond to a relatively important antenna. With this structure, in channel quantization, it is possible to improve the phase accuracy of the channel quantization.

Accuracy of amplitude in channel quantization may be also improved by performing norm scaling on each element of the first codebook. Accordingly, returning to FIG. 1, the step S103 may be performed after mapping at the step S102. Then, a norm scale factor of each transmission antenna that is fixed based on amplitude or power of the channel state information is used to perform scaling of the norm of an element corresponding to the transmission antenna in the codeword of the first codebook, and thereby, the second codebook is created. The second codebook may be used to finally perform precoding or channel quantization on transmission signals.

At the step S101, amplitude or power of the channel state information of channels between the transmission antennas having been subjected to norm scaling can be used as elements corresponding to respective transmission antennas in the second codebook.

Norm scale factors of the plural transmission antennas are shown in one norm scale matrix. This norm scale matrix is a diagonal matrix, in which elements in a diagonal line are norm scale factors to correspond to respective transmission antennas. Then, this norm scale matrix is multiplied by the matrix indicative of the first codebook to perform norm scaling. This will be described later, with reference to a specific example.

Figure 3:
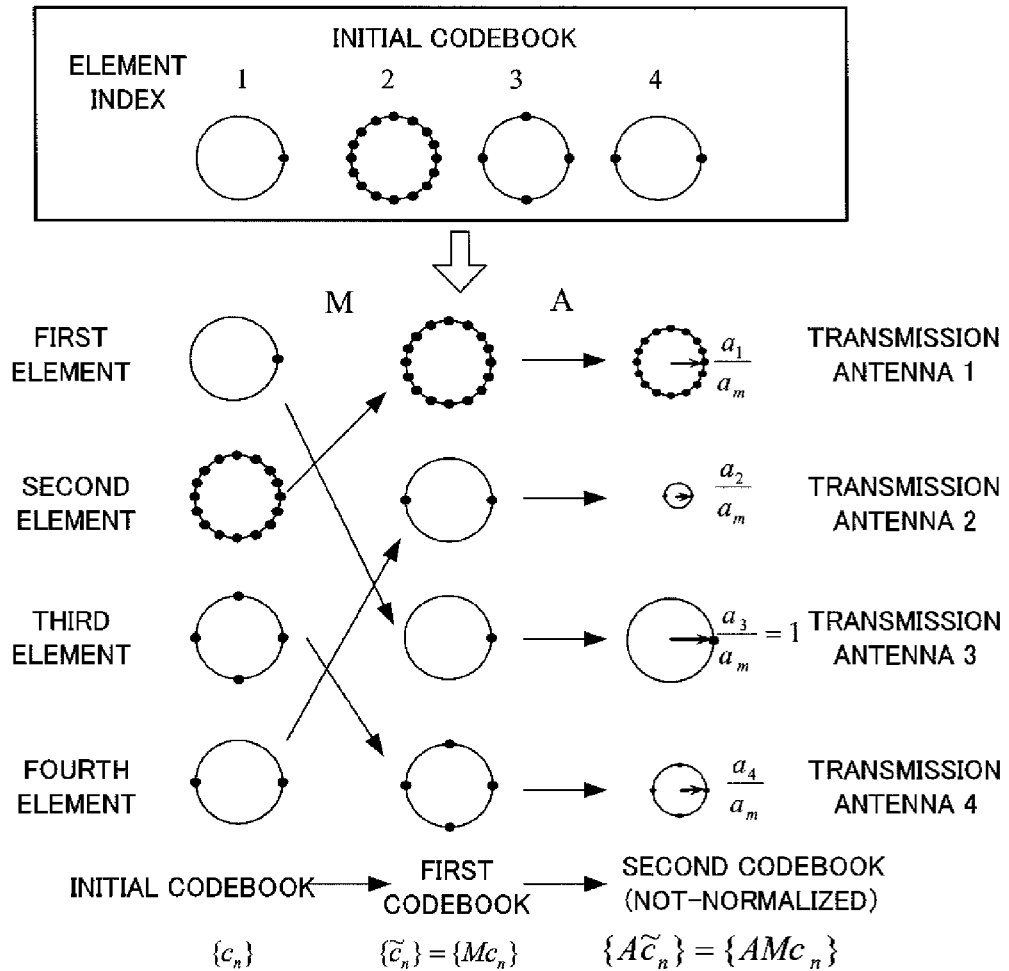
FIG. 3 is a diagram schematically illustrating an example of codebook creation according to the first embodiment of the present invention.

With reference to FIG. 3, an example of creating of a codebook according to the first embodiment of the present invention is described below. FIG. 3 illustrates the codebook creating example in the 4-transmission antenna MIMO system.

In this example, the initial codebook $\{C_n\}$ is used as an initial codebook according to the first embodiment of the present invention, in which n=1, 2, . . . , 16. The following vector is used to be able to express a codeword of the initial codebook $\{C_n\}$.

$$c_n = \begin{bmatrix} e^{j\theta_1} \\ e^{j\theta_2} \\ e^{j\theta_3} \\ e^{j\theta_4} \end{bmatrix}$$ [EXPRESSION 1]

In the expression, $N(\theta_2) \geq N(\theta_3) \geq N(\theta_4)$ is satisfied and $N(\theta_i)$ (i=2, 3, 4) indicates the number of all possible values of the phase $\theta_i$ in the initial codebook, that is, the phase resolution of the transmission antenna i corresponding to $\theta_i$. In other words, the phase resolutions of the second to fourth elements decrease gradually as a whole. For convenience of explanation, the codebook shown in Table 3 described above is used as the initial codebook $\{C_n\}$. The phases of the four elements of each codeword of the codebook are schematically shown by a circle in the upper part of FIG. 3 and the number of dots in the circumference represents phase resolutions (1, 16, 4, 2) of the respective elements.

First, amplitude or power of channel state information of channels between the four transmission antennas and the reception antenna of the base station is obtained. The magnitude relation of the amplitude or power of the channel state information of the respective transmission antennas can be fixed. Then, if the norm of each element of the right dominant singular value vector of the channel matrix H as obtained is amplitude of the channel state information, it can be assumed that the norm of each element of the right dominant singular vector corresponding to the four transmission antennas (that is, amplitude of the channel state information) meets the relation of transmission antenna 3>transmission antenna 1>transmission antenna 4>transmission antenna 2.

Then, based on the amplitude of the channel state information, each codeword element of the initial codebook is dynamically mapped to a corresponding transmission antenna so that the following first codebook is created.

$$\{\tilde{c}_n\} \qquad \text{[EXPRESSION 2]}$$

In this example, the above-mentioned first mapping method is used to map the element of phase resolution 1 (first element) to the transmission antenna 3 corresponding to the maximum amplitude. Then, as illustrated in the left side of the lower part in FIG. 3, the second to fourth elements of the initial codebook are mapped, in the decreasing order of phase resolution, to the transmission antennas 1, 4 and 2, respectively, of which corresponding amplitude or power decreases sequentially.

The permutation matrix M is able to represent the mapping relation between elements of the initial codebook and respective transmission antennas (or correspondence with elements of a codeword of the first codebook). Specifically, the line i of the matrix M corresponds to the transmission antenna i (the ith element in the first codebook), the column j of the matrix corresponds to elements of the initial codebook, indicating mapping with the value "1". When the ith element in the initial codebook is mapped to the transmission antenna j, the element of line i and column j of the permutation matrix M is 1 and other elements of the same line are 0 and thereby, the permutation matrix M is created.

In this embodiment, the permutation matrix M can be expressed as follows:

$$M = \begin{bmatrix} 0 & 1 & 0 & 0 \\ 0 & 0 & 0 & 1 \\ 1 & 0 & 0 & 0 \\ 0 & 0 & 1 & 0 \end{bmatrix} \qquad \text{[EXPRESSION 3]}$$

Mapping means multiplying the permutation matrix M by the codeword of the initial codebook. That is, this can be expressed as follows.

$$\{\tilde{c}_n\} = \{Mc_n\} \qquad \text{[EXPRESSION 4]}$$

Where the codeword $\tilde{c}_n$ of the first codebook $\{\tilde{c}_n\}$ is expressed as follows:

$$\tilde{c}_n = Mc_n = \begin{bmatrix} e^{j\theta_2} \\ e^{j\theta_4} \\ e^{j\theta_1} \\ e^{j\theta_3} \end{bmatrix}$$

As mapping is performed on each codeword, it is possible to create the following first codebook as shown in Table 4 below, based on the initial codebook in Table 3 (Likewise, for convenience of explanation, phases of the elements are only shown in Table 4).

$$\{\tilde{c}_n\} \qquad \text{[EXPRESSION 5]}$$

TABLE 4

| PMI | 0 | 1 | 2 | 3 | 4 | 5 | 6 | 7 |
|---|---|---|---|---|---|---|---|---|
| $\theta_1'$ | $\frac{0\pi}{8}$ | $\frac{1\pi}{8}$ | $\frac{2\pi}{8}$ | $\frac{3\pi}{8}$ | $\frac{4\pi}{8}$ | $\frac{5\pi}{8}$ | $\frac{6\pi}{8}$ | $\frac{7\pi}{8}$ |
| $\theta_2'$ | 0 | $\pi$ | 0 | $\pi$ | 0 | $\pi$ | 0 | $\pi$ |
| $\theta_3'$ | 0 | 0 | 0 | 0 | 0 | 0 | 0 | 0 |
| $\theta_4'$ | $\frac{0\pi}{2}$ | $\frac{1\pi}{2}$ | $\frac{2\pi}{2}$ | $\frac{3\pi}{2}$ | $\frac{0\pi}{2}$ | $\frac{1\pi}{2}$ | $\frac{2\pi}{2}$ | $\frac{3\pi}{2}$ |
| PMI | 8 | 9 | 10 | 11 | 12 | 13 | 14 | 15 |
| $\theta_1'$ | $\frac{8\pi}{8}$ | $\frac{9\pi}{8}$ | $\frac{10\pi}{8}$ | $\frac{11\pi}{8}$ | $\frac{12\pi}{8}$ | $\frac{13\pi}{8}$ | $\frac{14\pi}{8}$ | $\frac{15\pi}{8}$ |
| $\theta_2'$ | 0 | $\pi$ | 0 | $\pi$ | 0 | $\pi$ | 0 | $\pi$ |
| $\theta_3'$ | 0 | 0 | 0 | 0 | 0 | 0 | 0 | 0 |
| $\theta_4'$ | $\frac{0\pi}{2}$ | $\frac{1\pi}{2}$ | $\frac{2\pi}{2}$ | $\frac{3\pi}{2}$ | $\frac{0\pi}{2}$ | $\frac{1\pi}{2}$ | $\frac{2\pi}{2}$ | $\frac{3\pi}{2}$ |

In the initial codebook, the element of phase resolution 1 as the reference phase is mapped to the transmission antenna 3 corresponding to the maximum amplitude. For other elements of the initial codebook and transmission antennas other than the transmission antenna 3, if amplitude or power of the channel state information corresponding to a transmission antenna is small, the phase resolution of an element of the codeword of the initial codebook mapped to the transmission antenna is also small. In this way, a large phase resolution is assigned to an important transmission antenna (transmission antenna corresponding to large amplitude or power) and in channel quantization, it is possible to improve the accuracy of the phase of channel quantization.

In order to improve the accuracy of channel quantization, it is further possible to perform scaling on the norm of each element of the first codebook.

$$\{\tilde{c}_n\} \quad \text{[EXPRESSION 6]}$$

First, the amplitude or power of the channel state information corresponding to each transmission antenna (transmission antennas 1 to 4) is used as a basis to fix a norm scale factor.

In this example, norm scale factors of the respective transmission antennas are all shown in a norm scale matrix $\rho A$. A is a norm scale comparative matrix (factor) and represents proportionality relations of transmission power of the transmission antennas together. $\rho$ is a normalization factor for performing power normalization processing on the norm scale proportional matrix A so as to prevent the total transmission power of each transmission antenna from exceeding the total transmission power $P_{total}$ of the all transmission antennas and meets the following, where P is proper power value that is $P_{total}$ or less.

$$\rho = \sqrt{P}/|AMc_n| \quad \text{[EXPRESSION 7]}$$

Specifically, the norm scale proportional matrix A is a diagonal matrix and is able to adopt various forms. In the first form, the norm scale proportional matrix A can be expressed as follows:

$$A = \begin{bmatrix} \frac{\alpha_1}{\alpha_m} & & & \\ & \frac{\alpha_2}{\alpha_m} & & \\ & & \frac{\alpha_3}{\alpha_m} & \\ & & & \frac{\alpha_4}{\alpha_m} \end{bmatrix} = \frac{1}{\alpha_m}\begin{bmatrix} \alpha_1 & & & \\ & \alpha_2 & & \\ & & \alpha_3 & \\ & & & \alpha_4 \end{bmatrix} \quad \text{[EXPRESSION 8]}$$

In the expression, $\alpha_1$-$\alpha_4$ represent amplitude or power of channel state information corresponding to the transmission antennas 1-4, respectively (in the present example, norms of the respective elements of the right dominant singular vector of the channel matrix H of the channels between the transmission antennas and the reception antenna). Accordingly, $\alpha_3 > \alpha_1 > \alpha_4 > \alpha_2$. $\alpha_m$ is a maximum value among $\alpha_1$-$\alpha_4$, and in this example, $\alpha_m = \alpha_3$ is met. In the second form, $\alpha_m$ is omitted and the norm scale proportional matrix A is expressed as follows:

$$A = \begin{bmatrix} \alpha_1 & & & \\ & \alpha_2 & & \\ & & \alpha_3 & \\ & & & \alpha_4 \end{bmatrix} \quad \text{[EXPRESSION 9]}$$

By multiplying the norm scale proportional matrix A by the normalization factor $\rho$ to perform power normalization processing, the norm scale matrix $\rho A$ is obtained. Here, the norm scale factor of the ith transmission antenna is a diagonal element in the norm scale matrix $\rho A$.

$$\rho \frac{\alpha_i}{\alpha_m} \text{ (A adopts the first-form conditions) or} \quad \text{[EXPRESSION 10]}$$

$$\rho \alpha_i \text{(A adopts the second-form conditions)}$$

Then, the norm scale factor of each transmission antenna is used to perform scaling of an element corresponding to the transmission antenna in the codeword of the first codebook, thereby to create the second codebook.

$$\{\tilde{\tilde{c}}_n\} \quad \text{[EXPRESSION 11]}$$

This scaling can be expressed by a product of the norm scale matrix $\rho A$ and the first codebook $\{\tilde{c}_n\}$ as follows:

$$\{\tilde{\tilde{c}}_n\} = \{\rho A \tilde{c}_n\} = \{\rho A M c_n\} \quad \text{[EXPRESSION 12]}$$

FIG. 3 illustrates, in its right bottom, norm scaling in which power normalization is not performed. In this first codebook:

$$\{\tilde{c}_n\} \quad \text{[EXPRESSION 13]}$$

the norms of the elements corresponding to the transmission antennas 1-4 are subjected to scaling with different proportions and it can be seen that this proportion is determined by amplitude or power of the channel state information corresponding to the transmission antenna.

The thus created codebook allows improvement of phase accuracy and amplitude accuracy, and it is possible to improve the accuracy of the selected precoding matrix or channel quantization. A signal processed using this codebook reacts well to a channel situation of that time, which brings about improvement of the reception quality of the signal and the system performance.

In the above description, the base station is able to carry out the codebook creating method according to the first embodiment of the present invention in a similar manner as the UE does. Then, though the base station processes transmission symbols using only one codeword in the codebook, the base station creates the codebook as a whole. For example, in the example of 4-transmission antenna, the base station creates a codebook having 16 codewords, and uses only one codeword among them to process transmission symbols. This imposes excessive burdens on the base station. In order to solve this problem, the codebook creating method is implemented only in the UE, and in the base station, a codeword to use (optimal codeword selected by the UE) is created directly. This will be described later.

Specifically, the UE creates the second codebook by executing the above-described codebook creating method. Then, in accordance with a predetermined criterion, the UE selects an optimal codeword from the codebook and feeds the PMI or CDI indicative the selected optimal codeword back to the base station. This predetermined criterion may be any criterion that is selected based on an actual demand. For example, the predetermined criterion may be such that when the plurality of transmission antennas transmits signals using all the codewords of the codebook, a codeword which allows acquisition of an optimal channel quality or maximum channel capacity is selected, or a codeword corresponding to the optimal channel quantization accuracy is selected from among all the codewords. Besides, the base station obtains amplitude or power of channel state information of channels between the plural transmission antennas and the reception antenna in accordance with the above-mentioned form.

In the base station, the amplitude or power of the channel state information and PMI or CDI fed back from the UE are used as a basis to directly create the optimal codeword selected by the UE. Specifically, first, the codeword (hereinafter referred to as "initial codeword") indicated by the PMI or CDI is selected from the initial codebook of the base station. Then, the amplitude or power of the channel state information is used as a basis to map elements of the initial codeword dynamically to the plural transmission antennas and thereby to create the first codeword. In the above description, the method explained with reference to FIGS. 1 and 3 may be used to perform the dynamic mapping. Then, the norm scale factor of each transmission antenna that is fixed based on the amplitude or power of the channel state information is used to perform scaling of the norm of an element corresponding to the transmission antenna in the first codebook and thereby to create the second codeword. This second codeword is an optimal codeword selected by UE. As fixation of the norm scaling and execution of the norm scaling can be performed by the method explained with reference to FIG. 1 above, they are omitted here. As not all the codebooks, but only one codeword is created, the burden on the operation of the base station can be reduced drastically.

Further, instead of setting only one codeword, a plurality of codebooks may be set at the transmission side and the reception side so that optimal codebook and codeword can be selected based on a channel state. As the number of selectable codewords is increased, it is possible to select more optimal codebook and codeword from a greater number of codebooks and codewords thereby to allow finer channel configuration so that a selected codeword can be better matched to the channel state, and besides, the channel quantization error can be further decreased.

Figure 4:
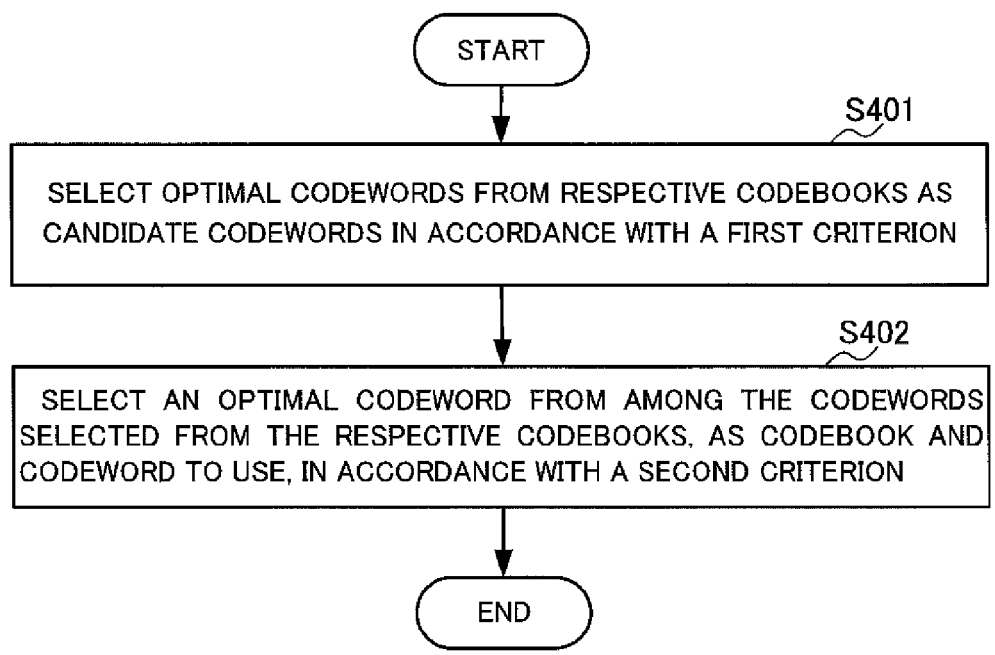
FIG. 4 is a flowchart of an initial codebook selecting method according to the first embodiment of the present invention.

With reference to FIG. 4, the method for selecting optimal codebook and codeword from a plurality of codebooks according to the first embodiment of the present invention will be described. These plural codebooks may include a Rel.8/10 codebook, a DFT codebook or any other codebooks. The plural codebooks preferably include codewords created in accordance with the codebook creating method according to the first embodiment of the present invention.

As illustrated in FIG. 4, at the step S401, an optimal codeword is selected as a candidate codeword from each codebook in accordance with the first criterion. This first criterion may be any criterion selected based on an actual demand. For example, the first criterion may be such that when the plural transmission antennas transmit signals using codewords of the codebook, a codeword that allows acquisition of optimal channel quality or maximum channel capacity is selected as the optimal codeword or a codeword corresponding optimal channel quantization accuracy is selected from codewords of the codebook as the optimal codeword.

Next, at the step S402, among candidate codewords selected from respective codebooks, an optimal codeword is selected in accordance with the second criterion to be used as the codebook and codeword. This second criterion may be any criterion selected based on an actual demand. For example, the second criterion may be such that when the plural transmission antennas transmit signals using respective candidate codewords, a codeword which allows acquisition of maximum channel capacity or optimal channel quality is selected as the optimal codeword or a codeword corresponding to the optimal channel quantization accuracy is selected from the candidate codewords as the optimal codeword.

This codebook selecting method may be conducted at the reception side (UE in the downlink or base station in the uplink). When the method is conducted in the UE, the UE needs to transmit an identifier indicative of the selected codebook to the base station so that the base station can select the codebook accordingly. Besides, the UE may be configured to transmit the PMI or CDI of the optimal codeword selected at the step S402 to the base station so that the base station can select the corresponding codeword from the selected codebook.

Then, description is made about the radio communication system and codebook creating apparatus according to the embodiment of the present invention.

Figure 5:
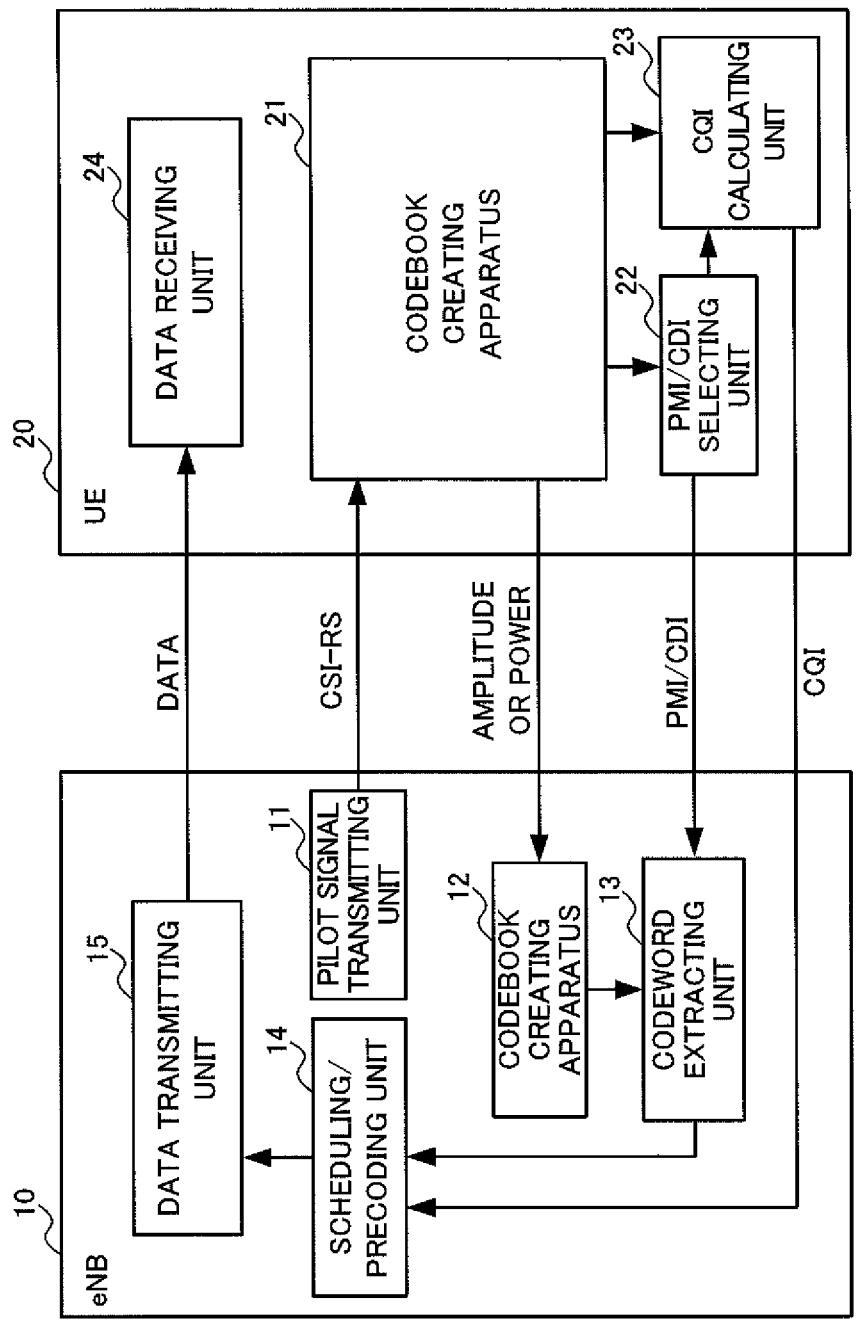
FIG. 5 is a block diagram of a radio communication system according to the first embodiment of the present invention.

FIG. 5 is a block diagram schematically illustrating a radio communication system for downlink communication according to the first embodiment of the present invention. As illustrated in FIG. 5, the radio communication system has a base station (eNB) 10 and a user terminal (UE) 20.

The base station 10 has a pilot signal transmitting unit 11, a codebook creating apparatus 12, a codeword extracting unit 13, a scheduling/precoding unit 14, a data transmitting unit 15 and a plurality of (for example, four) transmission antennas (not shown). The UE 20 has a codebook creating apparatus 21, a PMI/CDI selecting unit 22, a CQI calculating unit 23, a data receiving unit 24 and at least one reception antenna (not shown). In FIG. 5, relevant parts to the present invention in the base station and UE are merely illustrated, and the other parts in the base station and UE are not shown for convenience of explanation.

The pilot signal transmitting unit 11 in the base station 10 transmits pilot signals (CSI-RSs) via respective transmission antennas to the UE 20. The UE 20 receives the pilot signals via its reception antenna.

The codebook creating apparatus 21 of the UE 20 acquires amplitude or power of channel state information of channels between the plural transmission antennas and the reception antenna, based on the pilot signals, and creates a new codebook from the initial codebook based on the amplitude or power. The codebook creating apparatus 21 will be described later, with reference to FIG. 6. In this process, the UE 20 feeds the amplitude or power of the channel state information back to the base station to create the codebook at the base station. The UE 20 may feed it back periodically or aperiodically as requested by the base station 10. In periodic feedback, in order to reduce overhead by the feedback, a longer period (for example, a longer period than the PMI or CDI feedback period) may be adopted in the feedback or an average of power or amplitude of a plurality of subcarriers may be fed back, preferably.

The PMI/CDI selecting unit 22 selects an optimal codeword from codewords of the codebook created by the codebook creating apparatus 21, based on a predetermined criterion mentioned above, and feeds a PMI or CDI indicative of the selected codeword back to the base station 10. This feedback may be performed periodically or aperiodically.

The CQI calculating unit 23 calculates channel quality obtained when the plural transmission antennas transmit signals using a codeword selected by the PMI/CDI selecting unit 22 and feeds a channel quality identifier (CQI) indicative of the channel quality back to the base station 10.

At the base station 10 side, the codebook creating apparatus 12 uses a norm scale factor fed back from the UE 20 to create a codebook in the same manner as the codebook creating apparatus 21 of the UE 20 does.

The codeword extracting unit 13 uses the PMI/CDI fed back from the UE 20 to extract a corresponding codeword from the codebook created by the codebook creating apparatus 12 and provides the codeword to the scheduling/precoding unit 14.

The scheduling/precoding unit 14 uses the codeword provided from the codeword extracting unit 13 and the CQI fed back from the UE 20 corresponding to the codeword as a basis to perform necessary scheduling and/or precoding of data to transmit, and outputs the precoded data to the data transmitting unit 15.

The data transmitting unit 15 transmits the precoded data to the data receiving unit 24 of the UE 20 via the transmission antennas.

Figure 6:
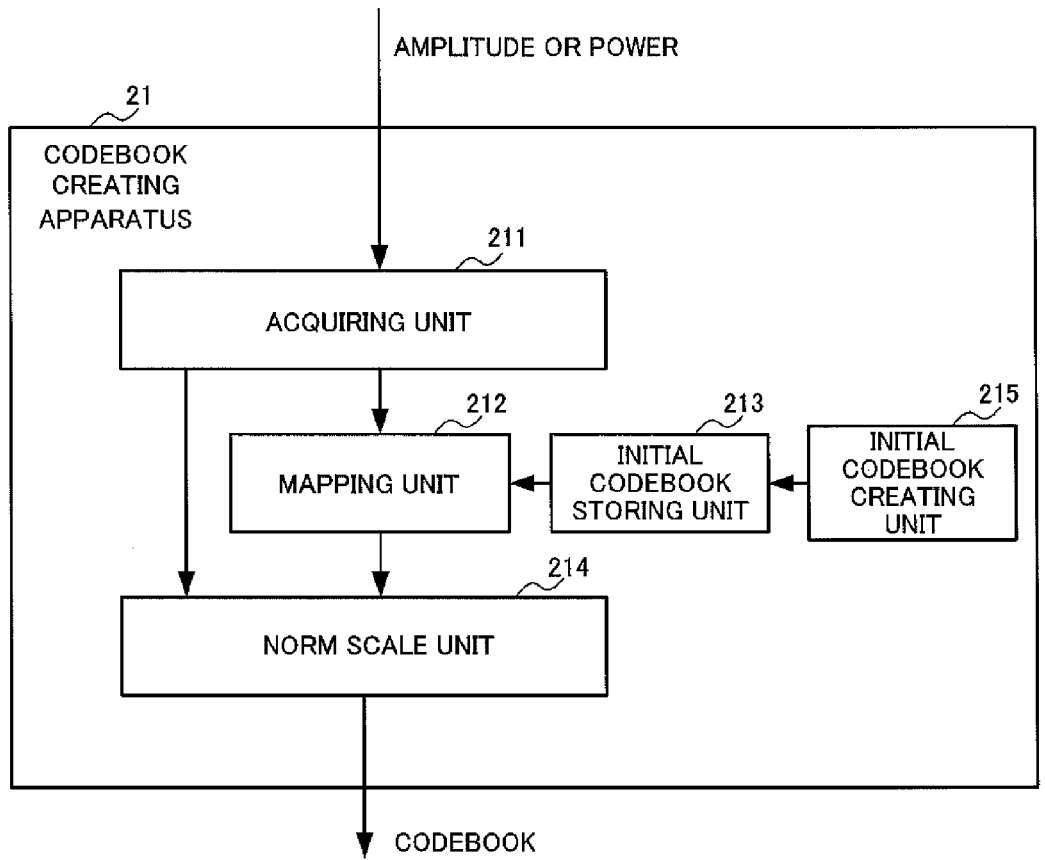
FIG. 6 is a block diagram of a codebook creating apparatus in the user terminal illustrated in FIG. 5.

Next description is made about the codebook creating apparatus 21 in the UE 20, with reference to FIG. 6.

As illustrated in FIG. 6, the codebook creating apparatus 21 has an acquiring unit 211, a mapping unit 212, an initial codebook storing unit 213 and a norm scale unit 214. In a modified embodiment, the codebook creating apparatus 21 has an initial codebook creating unit 215 configured to create the initial codebook according to the first embodiment of the present invention in accordance with the method described with reference to FIG. 2 above and store the initial codebook in the initial codebook storing unit 213.

The acquiring unit 211 is provided to acquire amplitude or power of channel state information of channels between the plural transmission antennas and the reception antenna. For example, the acquiring unit 211 uses the pilot signals received from the transmission antennas of the base station 10 to acquire amplitude or power of the channel state information of the channels between the plural transmission antennas and the reception antenna. With this structure, it is possible to fix the magnitude relation of the amplitude or power of the channel state information corresponding to each of the transmission antennas.

Specifically, the acquiring unit 211 measures reception amplitude and power of the pilot signal transmitted from each of the transmission antenna and sets them as the amplitude or power of the channel state information. Or, the acquiring unit 211 performs channel estimation using a pilot signal transmitted from each of the transmission antennas, acquires the channel matrix H that indicates the channels between the transmission antennas and the reception antenna and performs singular value decomposition (SVD) on the channel matrix H to be able to obtain the norm of each element of the right dominant singular vector of the channel matrix H as amplitude of the channel state information. As an alternative way, the acquiring unit 211 may receive the information from a measuring unit (not shown) that is provided in the UE 20 for performing the measurement or a channel estimating unit (not shown) for performing the channel estimation.

The mapping unit 212 maps codeword elements of the initial codebook dynamically to transmission antennas for transmitting the signals based on the amplitude or power of the channel state information and thereby creates the first codebook.

The initial codebook storing unit 213 performs storing of the initial codebook to use or other processing. As described above, the initial codebook may be any conventional codebook that is well known in this field such as Rel. 8/10 codebook or DFT codebook, or an initial codebook according to the first embodiment of the present invention created in advance by the initial codebook creating unit 215 (described later).

The mapping unit 212 performs the mapping based on the amplitude or power of the channel state information. Specifically, the mapping unit 212 maps an element of phase resolution 1 in the codeword of the initial codebook (its phase is generally 0) to any transmission antenna in accordance with the first mapping method described above, and maps other remaining elements of the codeword of the initial codebook to other transmission antennas. With this structure, the smaller the amplitude or power of channel state information of the channel between another transmission antenna and the reception antenna is, the lower the phase resolution of the element mapped to the transmission antenna is. In this mapping method, it is preferable that the mapping unit 212 maps the element of phase resolution 1 to the transmission antenna corresponding to the maximum amplitude or power or to the transmission antenna corresponding to the minimum amplitude or power. As an alternative way, the mapping unit 212 maps codeword elements of the initial codebook to respective transmission antennas in accordance with the second mapping method described above. With this structure, the smaller the amplitude or power of channel state information of the channel between a transmission antennas and the reception antenna is, the lower the phase resolution of the element mapped to the transmission antenna is. When some elements in the codeword of the initial codebook have same resolution, the mapping unit 212 may be able to select the mapping order of these elements arbitrarily. In implementation, as described with reference to FIG. 3 above, the mapping unit 202 creates the permutation matrix of the mapping relation and multiplies the codeword of the initial codebook by this permutation matrix to acquire the codeword of the first codebook.

The norm scale unit 214 performs scaling of norms of elements corresponding to the transmission antennas in the codewords of the first codebook, using norm scale factors of respective transmission antennas fixed based on amplitude or power of the channel state information, to create the second codebook. This second codebook is provided to the PMI/CDI selecting unit 22 for use in the following processing. The norm scale unit 214 fixes the norm scale factors of the respective transmission antennas in accordance with the above-mentioned method, multiplies the norm scale factors by elements corresponding to the respective transmission antennas in the first codebook and thereby realizes norm scaling.

Figure 7:
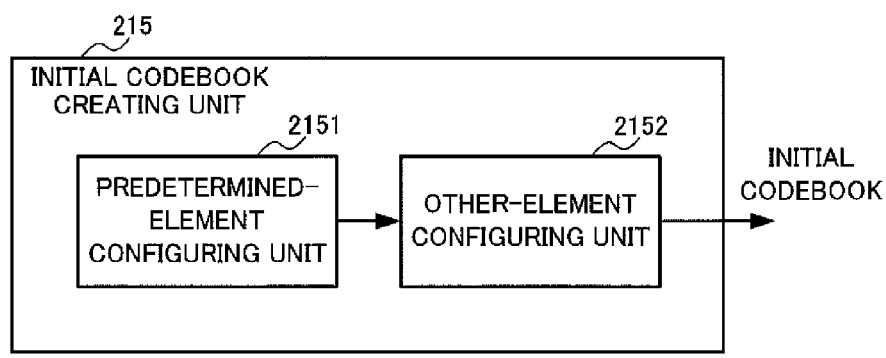
FIG. 7 is a block diagram of an initial codebook creating unit in the use terminal illustrated in FIG. 5.

The initial codebook creating unit (or apparatus) 215 creates the initial codebook according to the first embodiment of the present invention. As illustrated in FIG. 7, the initial codebook creating unit 215 includes a predetermined-element configuring unit 2151 and an other-element configuring unit 2152. The predetermined-element configuring unit 2151 configures a predetermined element in such a manner that the predetermined element in a codeword of the initial codebook has a predetermined phase resolution. The other-element configuring unit 2152 configures other elements in such a manner that the other elements in the codeword of the initial codebook are arranged in an increasing or decreasing order of phase resolution, creates the initial codebook and stores it in the initial codebook storing unit 213. Out of these elements, elements of the same phase resolution may be arranged in any order by the initial codebook creating unit 215.

Figure 8:
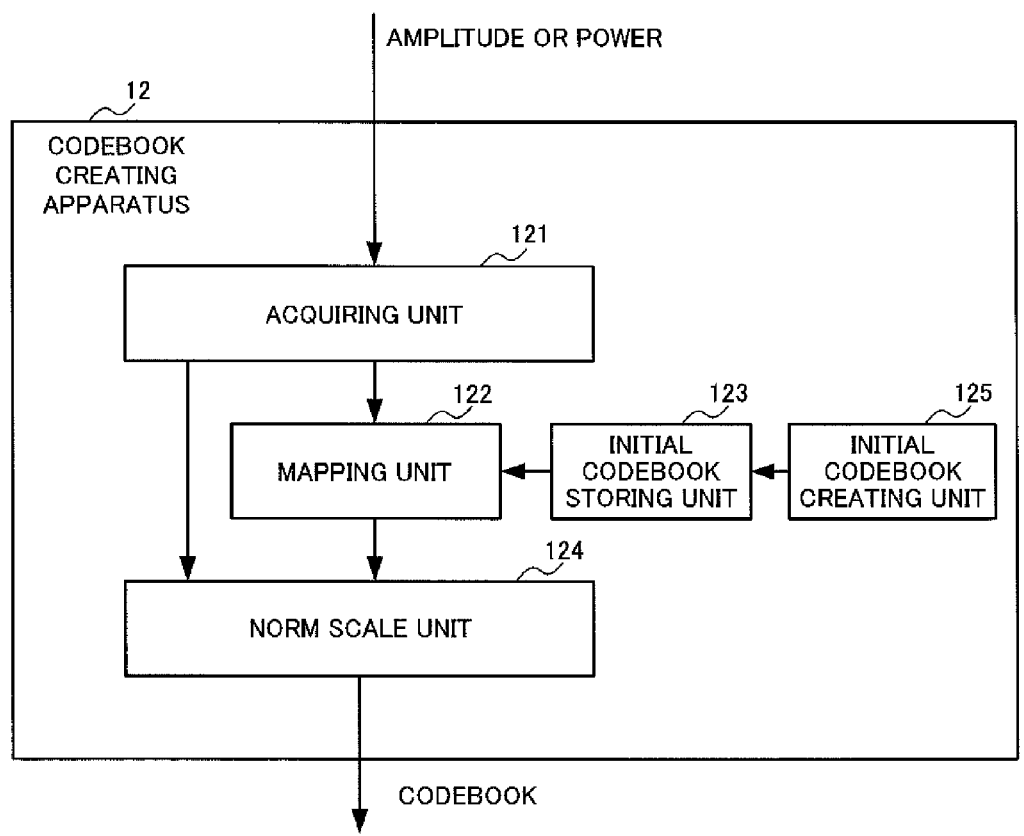
FIG. 8 is a block diagram of a codebook creating apparatus in the base station illustrated in FIG. 5.

Then, description is made, with reference to FIG. 8, about a codebook creating apparatus 12 in the base station 10. As illustrated in FIG. 8, the codebook creating apparatus 12 has an acquiring unit 121, a mapping unit 122, an initial codebook storing unit 123 and a norm scale unit 124. In a modified embodiment, the codebook creating apparatus 12 may further has an initial codebook creating unit 125.

The acquiring unit 121 acquires amplitude or power of channel state information of channels between the plural transmission antennas and the reception antenna. For example, the acquiring unit 121 receives reception power of signals transmitted from respective transmission antennas fed back periodically or aperiodically from the user terminal or norms of respective elements of a right dominant singular vector of the channel matrix of the channels to acquire the amplitude or power of the channel state information. As an alternative way, when the channels between the plural transmission antennas and the reception antenna have uplink/downlink exchange, the acquiring unit 121 measures the pilot signals or other analogue-type sounding signals transmitted from the user terminal thereby to acquire amplitude or power of the channel state information.

The mapping unit 122, the initial codebook storing unit 123, the norm scale unit 124, the initial codebook creating unit 125 are the same as the mapping unit 212, the initial codebook storing unit 213, the norm scale unit 214 and the initial codebook creating unit 215 shown in FIG. 6, respectively, and therefore, their explanation is omitted here. The initial codebook stored in the initial codebook storing unit 123 (traditional codebook or initial codebook created by the initial codebook creating unit 125) is the same as that of the initial codebook storing unit 213 and therefore, it should be noted that the codebook creating apparatus 12 creates the same codebook as the codebook creating apparatus 21.

The codebook creating apparatuses in the base station and the mobile station described above are given merely for the purpose of explanation and are not intended to limit the present invention. The codebook creating apparatuses may have any other configurations. For example, it may be possible that the initial codebook storing unit and the initial codebook creating unit are arranged at other parts of the base station and the mobile station and provide the stored/created codebooks to the codebook creating apparatuses when necessary. It may be also possible that the initial codebook creating unit is omitted, the initial codebook of the first embodiment of the present invention and other codebooks are stored in advance in the initial codebook storing unit 123. In FIG. 5, the UE feeds various-kind information such as PMI/CDI and CQI back to the base station via a plurality of single channels. However, this is merely an example, and the same or different channels may be used to feed the information back to the base station.

Figure 9:
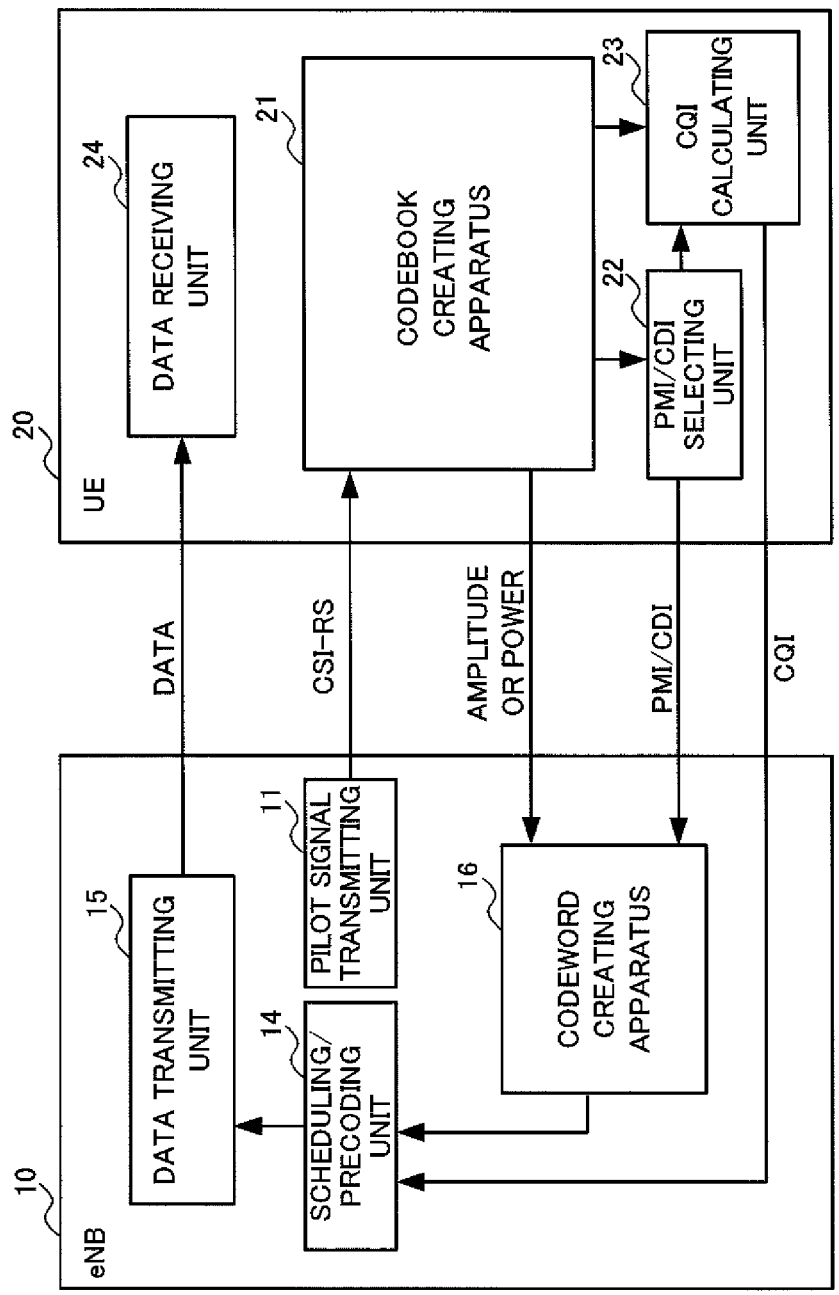
FIG. 9 is a block diagram of a radio communication system according to a second embodiment of the present invention.

In the base station, instead of executing the codebook creating operation analogue to that of the UE to create the entire codebook, the base station may create only an optimal codeword selected by the UE, not the entire codebook, based on the information fed back by the UE thereby to reduce burden on the operation. Based on this idea, there has been proposed a radio communication system for downlink communication according to the second embodiment of the present invention as shown in FIG. 9.

In the radio system, the codebook creating apparatus 12 and the codeword extracting unit 13 in the radio communication system of the first embodiment are replaced with a codeword creating apparatus 16 and the other parts are not changed. Here, for convenience of explanation, the codeword creating apparatus 16 is only described as a difference between these systems.

Figure 10:
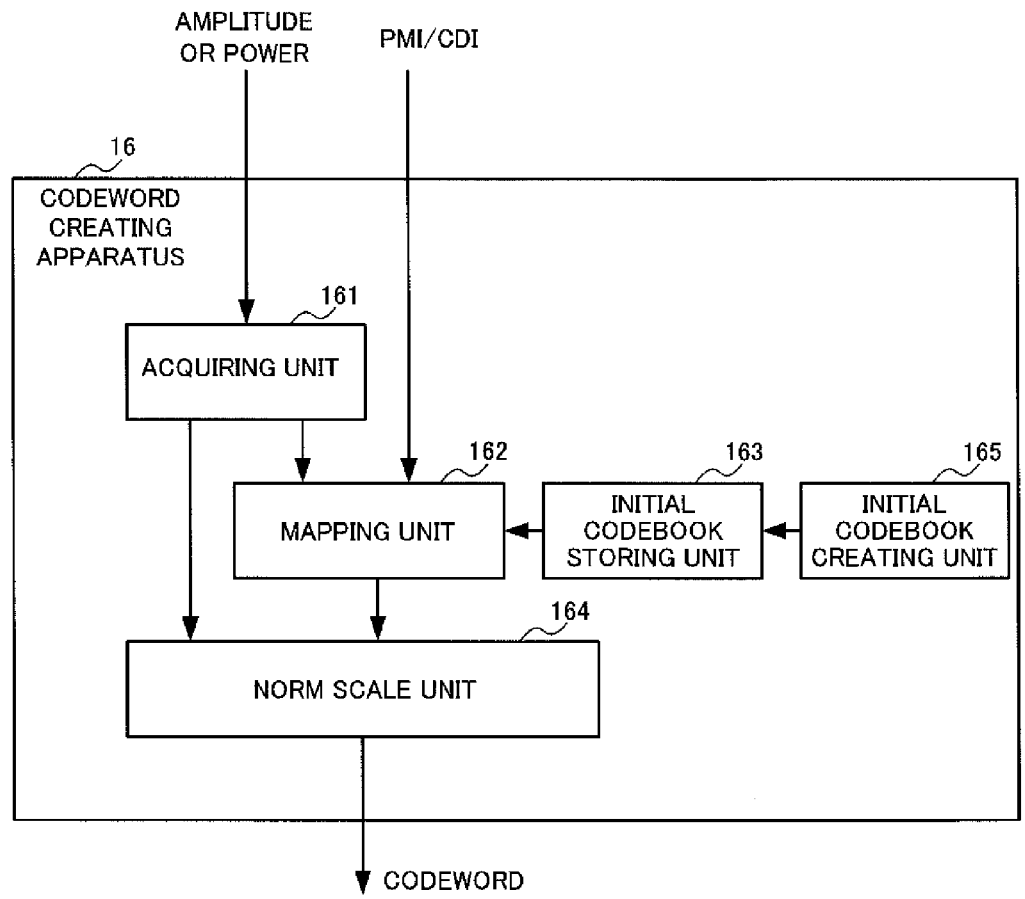
FIG. 10 is a block diagram of a codeword creating apparatus in the base station illustrated in FIG. 9.

As illustrated in FIG. 10, the codeword creating apparatus 16 has an acquiring unit 161, a mapping unit 162, an initial codebook storing unit 163, and a norm scale unit 164. In a modified embodiment, the codeword creating apparatus 16 further may have an initial codebook creating unit 165. The initial codebook storing unit 163 and the initial codebook creating unit 165 are the same as the initial codebook storing unit 123 and the initial codebook creating unit 125 described with reference to FIG. 5, respectively.

As described above, the UE 20 feeds back to the base station 10, the amplitude of channel state information of channels between the plural transmission antennas and the reception antenna and the PMI or CDI indicative of the optimal codeword selected from codewords of the codebook created by the codebook creating apparatus 21.

The acquiring unit 161 acquires the amplitude or power of the channel state information of channels between the plural transmission antennas and the reception antenna by the same method as the acquiring unit 121.

The mapping unit 162 receives the PMI or CDI fed back from the UE, selects a codeword (hereinafter referred to as "initial codeword") indicated by the PMI/CDI from the codebook, dynamically maps elements of the initial codeword to respective transmission antennas based on the amplitude or power of the channel state information of the channels and generates the first codeword. As the mapping unit 162 is able to perform mapping in accordance with the method described with reference to FIGS. 1 to 3 above, its explanation is omitted here.

The norm scale unit 164 uses norm scale factors of the respective transmission antenna fixed based on the amplitude or power of the channel state information to perform scaling on the norms of the elements corresponding to the transmission antennas in the first codeword and thereby to create norm-scaled codeword (hereinafter referred to as "second codeword"). The second codeword which is the optimal codeword selected by the UE is provided to the PMI/CDI selecting unit 22 for the following processing. The norm scale unit 164 fixes the norm scale factors in accordance with the method explained with reference to FIG. 1 above to perform norm scaling.

In the example of 4 transmission antennas, the base station in the radio communication system according to the first embodiment of the present invention needs to create 16 codewords, however the base station in the radio communication system according to the second embodiment of the present invention has only to create one codeword, which allows marked reduction in burdens on the operation.

In the radio communication system according to the first embodiment of the present invention, only one codebook is created and its codewords are used in processing of transmission symbols. However, the transmission side and the reception side store/create a plurality of codebooks and select optimal codebook or codewords to use from them, and thereby, the phase quantization accuracy in channel quantization may be improved. Based on this idea, there is proposed a radio communication system according to the third embodiment of the present invention shown in FIG. 11. This system based on the radio communication system according to the first embodiment of the present invention shown in FIG. 5.

Figure 11:
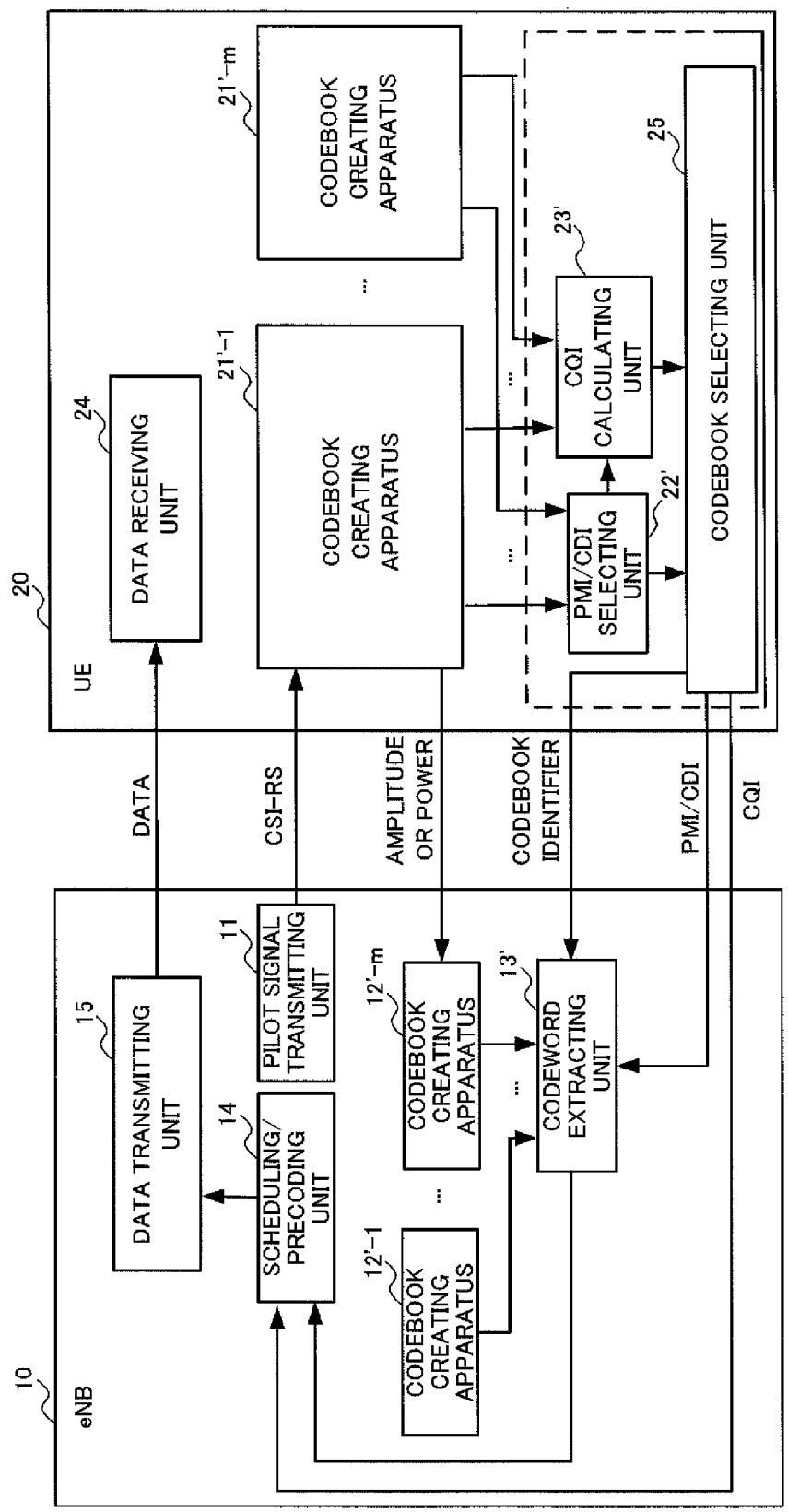
FIG. 11 is a block diagram of a radio communication system according to a third embodiment of the present invention.

The radio communication system as shown in FIG. 11 has a base station 10 and UE 20. The base station 10 has a pilot signal transmitting unit 11, m codebook creating apparatuses 12'-1 to 12'-m (m>1), a codeword extracting unit 13' a scheduling/precoding unit 14, a data transmitting unit 15, and a plurality of transmission antennas (not shown).

The UE 20 has m codebook creating apparatuses 21'-1 to 21'-m, a PMI/CDI selecting unit 22', a CQI calculating unit 23', a data receiving unit 24, a codebook selecting unit 25 and at least one reception antenna (not shown). The pilot signal transmitting unit 11, the scheduling/precoding unit 14 and the data transmitting unit 15 in the base station 10 and the data receiving unit 24 in the UE 20 are the same as corresponding units shown in FIG. 5 and their explanation is omitted here.

In the UE 20, each of the m codebook creating apparatuses 21'-1 to 21'-m creates one codebook. These codebook creating apparatuses may be any codebook creating apparatuses that are well known in this field. As a better way, at least one codebook creating apparatus (for example, 21'-1) is the codebook creating apparatus 21 according to the first embodiment of the present invention and creates the codebook according to the first embodiment of the present invention.

As illustrated in the dotted box of FIG. 11, the PMI/CDI selecting unit 22', the CQI calculating unit 23' and the codebook selecting unit 25 make up a codebook selecting apparatus.

Specifically, the PMI/CDI selecting unit 22' selects optimal codewords as candidate codewords from the codebooks created by the m codebook creating apparatuses 21'-1 to 21'-m, respectively, in accordance with the first criterion, and provides a PMI/CDI indicative of each of the candidate codewords to the codebook selecting unit 25. As for each candidate codeword selected by the PMI/CDI selecting unit 22', the CQI calculating unit 23' calculates channel quality obtained when the codeword is used by the transmission antenna and provides a CQI indicative of the channel quality to the codebook selecting unit 25.

The codebook selecting unit 25 selects optimal codewords from the candidate codewords selected from the codebooks and arranges them as a codebook and codewords to use in final data processing. Then, the codebook selecting unit 25 may feed the codebook identifier indicative of the finally selected codebook back to the base station. Further, the codebook selecting unit 25 may feed the PMI/CDI indicative of the optima codeword selected from the codebook back to the base station 10.

In the base station 10 side, the m codebook creating apparatuses 12'-1 to 12'-m create the same codebooks in accordance with the same method as the codebook creating apparatuses 21'-1 to 21'-m. do When at least one codebook creating apparatus in the UE 20 is the codebook creating apparatus 21 according to the first embodiment of the present invention, the at least one codebook creating apparatus (for example 12'-1) becomes the codebook creating apparatus 12 according to the first embodiment of the present invention.

The codeword extracting unit 13' uses the codebook identifier fed back from the UE 20 as a basis to select a corresponding codebook from codebooks created by the m codebook creating apparatuses 21'-1 to 21'-m, and then, selects codewords corresponding to the codebook based on PMI/CDIs fed back from the UE 20 and provides the codewords to the scheduling/precoding unit 14 for the following processing.

The radio communication system shown in FIG. 11 is given merely for the purpose of explanation and is not intended for limiting the present invention. This system may be added with various modifications without departing from the scope of the present invention. For example, the entire part or a part of the codebook creating apparatus shown in FIG. 11 may be replaced with a codebook storing unit which stores the codebooks. The PMI/CDI selecting unit 22', the CQI calculating unit 23' and the codebook selecting unit 25, which are separated from each other, may be combined into one selecting unit to select the codebook.

As the plural codebooks are set, it is possible to select an optimal codeword from a greater number of codebooks and codewords and further improve the channel quantization accuracy by matching a finally used codeword to current channel states.

Likewise, the radio communication system shown in FIG. 11 is simplified thereby to be able to reduce burdens of the operation of the base station. Specifically, as illustrated in FIG. 12, in the radio communication system according to the fourth embodiment of the present invention, the m codebook creating apparatuses 21'-1 to 21'-m shown in FIG. 11 are replaced with codeword creating apparatuses 12"-1 to 12"-m, the codeword extracting unit 13' is replaced with the codeword selecting unit 13" and other parts are not changed.

In the fourth embodiment, the UE 20 selects codebook and codewords, and feeds PMI/CDIs indicative of codewords selected in the codebook and codeword identifiers indicative of the selected codewords back to the base station 10. In the base station 10, instead of creating the whole codebook, the codeword creating apparatus corresponding to each codebook creating apparatus in UE is used to create the selected codewords directly, and therefore, the codebook identifiers fed back from the UE 20 are used as identifiers that instruct the corresponding codeword creating apparatuses.

Specifically, the codeword selecting unit 13" instructs a corresponding codeword creating apparatus to create an optimal codeword selected by the UE, based on the codebook identifier fed back from the UE 20, and provides the generated codeword to the scheduling/precoding unit 14 for the following processing. The codeword creating apparatus is able to create a codeword selected based on the PMI/CDI in accordance with the method for creating single codeword by a corresponding codeword creating apparatus in UE. For example, if the UE 20 has the codeword creating apparatus according to the first embodiment of the present invention, the codeword creating apparatus in the base station corresponding to the codeword creating apparatus in the UE creates a codeword selected by the UE from the initial codebook in accordance with the method for creating a single codeword by the codeword creating apparatus (method explained with reference to FIG. 10).

Figure 12:
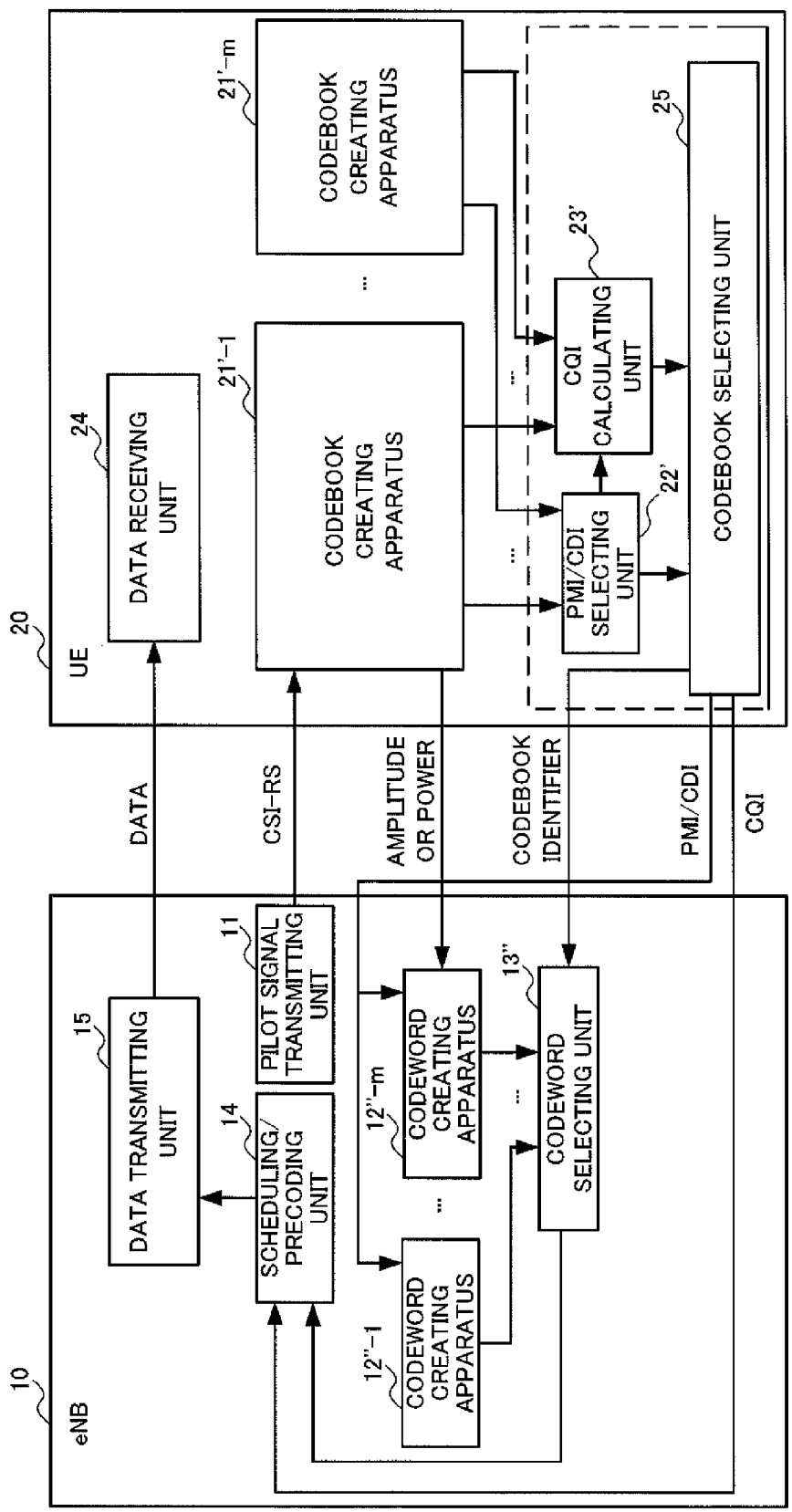
FIG. 12 is a block diagram of a radio communication system according to a fourth embodiment of the present invention.

The radio communication system shown in FIG. 12 is given merely for the purpose of explanation, and is not intended to limit the present invention. In a modified example, the codeword creating apparatuses in the base station may create respective codewords based on the PMI/CDIs and the codeword selecting unit 13" may select a codeword generated by the codeword creating apparatus indicated by the codebook identifier from these codewords. In another modified example, it may be configured that the codeword selecting unit 13" is omitted, each codeword creating apparatus judges whether itself is selected or not in accordance with the codeword identifier and when it is selected, then, the codeword creating apparatus creates the codeword.

The codebook creating apparatus according to the embodiments of the present invention may create codebooks that are applicable to CoMP system or MIMO system having a distributed antenna arrangement (particularly, MU-MIMO system having distributed antenna arrangement) by a simple method, and even when reception power of signals transmitted from respective transmission antennas are not uniform, it is possible to reduce channel quantization error and thereby to improve the system performance. Further, the codebook creating apparatus according to the embodiments of the present invention can be applied to the MIMO system having a centralized antenna arrangement thereby to reduce channel quantization error.

The embodiments and drawings of the present invention have been described up to this point, however, a person of ordinary skill in the art should understand that any formal or detailed modifications may be made to these embodiments without departing from the scope or gist of the present invention that is restricted by the claims and their equivalence.

The disclosure of Chinese Patent Application No. 201210122385.X, filed on Apr. 24, 2012, including the specification, drawings, and abstract, is incorporated herein by reference in its entirety.

The invention claimed is:

1. A codebook creating method in a radio communication system having a plurality of transmission antennas and a reception antenna, the codebook creating method comprising the steps of:
acquiring amplitude or power of channel state information of channels between the transmission antennas and the reception antenna; and
mapping elements of a codeword of an initial codebook dynamically to the respective transmission antennas based on the amplitude or power of the channel state information thereby to create a first codebook.

2. The codebook creating method according to claim 1, further comprising the step of: scaling norms of elements corresponding to the respective transmission antennas in a codeword of the first codebook by using norm scale factors of the respective transmission antennas fixed based on the amplitude or power of the channel state information.

3. The codebook creating method according to claim 1, wherein the amplitude or power of the channel state information is acquired by acquiring reception power of signals transmitted by the respective transmission antennas or nouns of the respective elements of a right dominant singular vector of a channel matrix of the channels.

4. The codebook creating method according to claim 1, wherein the step of mapping the elements has the steps of:
mapping an element of phase resolution 1 in the codeword to any of the transmission antennas; and
mapping other elements of the codeword to other transmission antennas,
wherein the smaller amplitude or power of channel state information of channels between the other transmission antennas and the reception antenna is, the lower a phase resolution of each of the elements mapped to the other transmission antennas is, and
the phase resolution indicates a number of all possible phases for elements of a same position in all codewords of the initial codebook.

5. The codebook creating method according to claim 4, wherein an element of phase resolution 1 is mapped to a transmission antenna of which amplitude or power of channel state information of a channel between the transmission antenna and the reception antenna is maximized or minimized.

6. The codebook creating method according to claim 1, wherein
the step of mapping the elements has a step of mapping the elements of the codeword to the respective transmission antennas in such a manner that the smaller amplitude or power of the channel state information of the channels between the transmission antennas and the reception antenna is, the lower a phase resolution of each of the elements mapped to the transmission antennas is, and
the phase resolution indicates a number of all possible phases for elements of a same position in all codewords of the initial codebook.

7. The codebook creating method according to claim 1, wherein the initial codebook is a constant modulus codebook.

8. The codebook creating method according to claim 7, wherein
the initial codebook is created by configuring the elements in such a manner that a predetermined element of the codeword of the initial codebook has a predetermined phase resolution and other elements of the codeword of the initial codebook are arranged in an increasing or decreasing order of phase resolution, and in the initial codebook, an order of arrangement between elements of same phase resolution is an arbitrary order and the phase resolution indicates a number of all possible phases for elements of a same position in all codewords of the initial codebook.

9. The codebook creating method according to claim 1, wherein the codebook creating method is implemented by a reception side, the amplitude or power of the channel state information is acquired at the reception side by measuring reception power of signals transmitted from the respective transmission antennas or calculating norms of the respective elements of a right dominant singular vector of a channel matrix of the channels, and the amplitude or power of the channel state information is periodically or aperiodically fed back to a transmission side.

10. The codebook creating method according to claim 9, wherein
the reception side further selects an optimal codeword from a second codebook based on a predetermined criterion and feeds a codeword identifier indicative of the optimal codeword back to the transmission side; and
the transmission side creates an optimal codeword by:
selecting an initial codeword identified by the codeword identifier from the initial codebook;
mapping elements of the initial codeword dynamically to the transmission antennas based on, the amplitude or power of the channel state information to create a first codeword; and
scaling norms of elements corresponding to the respective transmission antennas in the first codeword using norm scale factors of the respective transmission antennas fixed based on the amplitude or power of the channel state information thereby to create a second codeword as the optimal codeword.

11. The codebook creating method according to claim 1, wherein a transmission side implements the codebook creating method and the transmission side acquires the amplitude or power of the channel state information by receiving reception power of signals transmitted from the respective transmission antennas or norms of the respective elements of a right dominant singular vector of a channel matrix of the channels periodically or aperiodically fed back from a reception side.

12. The codebook creating method according to claim 1, wherein a transmission side implements the codebook creating method and, when the channels has uplink/downlink exchange, the transmission side acquires the amplitude or power of the channel state information by measuring sounding signals or pilot signals transmitted from a reception side.

13. An initial codebook creating method having a codeword having plurality of elements, comprising the steps of:
configuring a predetermined element of the codeword of the initial codebook to have a predetermined phase resolution; and
configuring other elements of the codeword of the initial codebook to be arranged in an increasing or decreasing order of phase resolution, and
wherein in the initial codebook, an order of arrangement between elements of same phase resolution is an arbitrary order and the phase resolution indicates a number of all possible phases for elements of a same position in all codewords of the initial codebook.

14. The initial codebook creating method according to claim 13, wherein the predetermined phase resolution is 1 and the predetermined element is any element of the codeword.

15. The initial codebook creating method according to claim 13, wherein the predetermined phase resolution is more or less than phase resolutions of the other elements, and the predetermined element and the other elements are arranged in an increasing or decreasing order of phase resolution.

16. A codebook creating apparatus in a radio communication system having a plurality of transmission antennas and a reception antenna, the codebook creating apparatus comprising:
   an acquiring unit configured to acquire amplitude or power of channel state information of channels between the transmission antennas and the reception antenna; and
   a mapping unit configured to map elements of a codeword of an initial codebook dynamically to the respective transmission antennas based on the amplitude or power of the channel state information thereby to create a first codebook.

17. The codebook creating apparatus according to claim 16, further comprising: a norm scale unit configured to scale nouns of elements corresponding to the respective transmission antennas in a codeword of the first codebook by using norm scale factors of the respective transmission antennas fixed based on the amplitude or power of the channel state information.

18. The codebook creating apparatus according to claim 16, wherein the amplitude or power of the channel state information is acquired by acquiring reception power of signals transmitted by the respective transmission antennas or norms of the respective elements of a right dominant singular vector of a channel matrix of the channels.

19. The codebook creating apparatus according to claim 16, wherein
   the mapping unit maps an element of phase resolution 1 in the codeword to any of the transmission antennas and maps other elements of the codeword to other transmission antennas,
   the smaller amplitude or power of channel state information of channels between the other transmission antennas and the reception antenna is, the lower a phase resolution of each of the elements mapped to the other transmission antennas is, and
   the phase resolution indicates a number of all possible phases for elements of a same position in all codewords of the initial codebook.

20. The codebook creating apparatus according to claim 19, wherein the mapping unit maps an element of phase resolution 1 to a transmission antenna of which amplitude or power of channel state information of a channel between the transmission antenna and the reception antenna is maximized or minimized.

21. The codebook creating apparatus according to claim 16, wherein the mapping unit maps the elements of the codeword to the respective transmission antennas in such a manner that the smaller amplitude or power of the channel state information of the channels between the transmission antennas and the reception antenna is, the lower a phase resolution of each of the elements mapped to the transmission antennas is, and
   the phase resolution indicates a number of all possible phases for elements of a same position in all codewords of the initial codebook.

22. The codebook creating apparatus according to claim 16, wherein the initial codebook is a constant modulus codebook.

23. The codebook creating apparatus according to claim 22, further comprising: an initial codebook creating unit configured to create the initial codebook by configuring the elements in such a manner that a predetermined element of the codeword of the initial codebook has a predetermined phase resolution and other elements of the codeword of the initial codebook are arranged in an increasing or decreasing order of phase resolution, and
   in the initial codebook, an order of arrangement between elements of same phase resolution is an arbitrary order and the phase resolution indicates a number of all possible phases for elements of a same position in all codewords of the initial codebook.

24. The codebook creating apparatus according to claim 16, wherein
   the codebook creating apparatus is installed on a reception side, and
   the acquiring unit acquires the amplitude or power of the channel state information by measuring reception power of signals transmitted from the respective transmission antennas or calculating norms of the respective elements of a right dominant singular vector of a channel matrix of the channels, and the amplitude or power of the channel state information is periodically or aperiodically fed back to a transmission side.

25. The codebook creating apparatus according to claim 24, wherein
   the reception side further selects an optimal codeword from a second codebook based on a predetermined criterion and feeds a codeword identifier indicative of the optimal codeword back to the transmission side; and
   the transmission side creates an optimal codeword by:
   selecting an initial codeword identified by the codeword identifier from the initial codebook;
   mapping elements of the initial codeword dynamically to the transmission antennas based on the amplitude or power of the channel state information to create a first codeword; and
   scaling norms of elements corresponding to the respective transmission antennas in the first codeword using norm scale factors of the respective transmission antennas fixed based on the amplitude or power of the channel state information thereby to create a second codeword as the optimal codeword.

26. The codebook creating apparatus according to claim 16, wherein
   the codebook creating apparatus is installed on a transmission side, and
   the acquiring unit acquires the amplitude or power of the channel state information by receiving reception power of signals transmitted from the respective transmission antennas or norms of the respective elements of a right dominant singular vector of a channel matrix of the channels periodically or aperiodically fed back from a reception side.

27. The codebook creating apparatus according to claim 16, wherein
   the codebook creating apparatus is installed on a transmission side, and
   when the channels has uplink/downlink exchange, the acquiring unit acquires the amplitude or power of the channel state information by measuring sounding signals or pilot signals transmitted from a reception side.

* * * * *